(12) United States Patent
Herrington et al.

(10) Patent No.: US 10,482,471 B2
(45) Date of Patent: Nov. 19, 2019

(54) UNAUTHORIZED PRODUCT DETECTION TECHNIQUES

(71) Applicant: Amazon Technologies, Inc., Reno, NV (US)

(72) Inventors: Douglas James Herrington, Seattle, WA (US); Shehzad Mevawalla, Bellevue, WA (US); Rajiv Chopra, Bellevue, WA (US); Joseph Sirosh, Bellevue, WA (US); Sachin Chouksey, Seattle, WA (US); Maria Christine Renz, Seattle, WA (US); Sarah Ann Wood, Bellevue, WA (US); Jeffrey P. Bezos, Greater Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 886 days.

(21) Appl. No.: 13/743,092

(22) Filed: Jan. 16, 2013

(65) Prior Publication Data

US 2014/0201094 A1    Jul. 17, 2014

(51) Int. Cl.
*G06Q 30/00*   (2012.01)
*G06K 9/00*    (2006.01)

(52) U.S. Cl.
CPC ....... *G06Q 30/018* (2013.01); *G06K 9/00577* (2013.01)

(58) Field of Classification Search
USPC ........................................................ 705/317
See application file for complete search history.

(56) References Cited

U.S. PATENT DOCUMENTS 5,974,150 A    10/1999    Kaish et al.
6,014,453 A    1/2000     Sonoda et al.
(Continued)

FOREIGN PATENT DOCUMENTS

JP    2005092690    4/2005
JP    2007279812    10/2007
(Continued)

OTHER PUBLICATIONS

International Search Report and Written Opinion from PCT/US2014/011892, dated May 9, 2014, Amazon Technologies, pp. 1-11.
(Continued)

*Primary Examiner* — Andrew B Whitaker
(74) *Attorney, Agent, or Firm* — Robert C. Kowert; Meyertons, Hood, Kivlin, Kowert & Goetzel, P.C.

(57) ABSTRACT

An unauthorized-product detection system may compare data representing various authentication markers of items presumed to have been produced or sourced by a particular entity with stored data representing valid authentication markers of items produced or sourced by the particular entity. The authentication markers may represent inherent physical characteristics of the items or their packaging, or may be generated and applied to the items or their packaging to facilitate counterfeit detection and/or for other purposes. The data (some of which may be encrypted) may be captured using high-resolution cameras, scanners, or other devices, and then communicated to the unauthorized-product detection system for analysis. The system may maintain a data store of data representing captured or valid authentication markers and may store tracking information reflecting the use of various authentication markers. The system may provide various unauthorized product detection services to consumers, retailers, or members of a supply-chain.

37 Claims, 13 Drawing Sheets

(56) References Cited

U.S. PATENT DOCUMENTS

| | | | |
|---|---|---|---|
| 7,089,420 B1* | 8/2006 | Durst | G09C 5/00 283/72 |
| 8,045,753 B2 | 10/2011 | Adams et al. | |
| 2003/0154406 A1* | 8/2003 | Honarvar | G06Q 10/10 726/10 |
| 2004/0117634 A1* | 6/2004 | Letterer | G06F 17/30876 713/182 |
| 2004/0153649 A1* | 8/2004 | Rhoads | G06F 17/241 713/176 |
| 2005/0077488 A1 | 4/2005 | Nekrasov et al. | |
| 2005/0173516 A1 | 8/2005 | Fujioka | |
| 2005/0236113 A1 | 10/2005 | Tani et al. | |
| 2006/0175226 A1 | 8/2006 | Abergel | |
| 2007/0215685 A1* | 9/2007 | Self | G06Q 30/06 235/375 |
| 2008/0116276 A1 | 5/2008 | Lo | |
| 2008/0120710 A1* | 5/2008 | Holz | G06K 7/10346 726/7 |
| 2009/0089175 A1* | 4/2009 | Platek | G06Q 10/08 705/26.1 |
| 2009/0100271 A1* | 4/2009 | Harris | G09F 3/0292 713/189 |
| 2009/0228554 A1* | 9/2009 | Veiseh | H04L 63/0428 709/204 |
| 2011/0038012 A1* | 2/2011 | Massicot | H04N 1/32144 358/3.28 |
| 2011/0093113 A1 | 4/2011 | Sager et al. | |
| 2011/0183710 A1* | 7/2011 | Selva | G06K 19/086 455/556.1 |
| 2011/0220560 A1 | 9/2011 | Verdegan et al. | |
| 2011/0231316 A1 | 9/2011 | Carroll, III | |
| 2011/0276502 A1* | 11/2011 | Dameri | G06Q 30/018 705/317 |
| 2011/0284635 A1 | 11/2011 | Lapstun et al. | |
| 2012/0041887 A1 | 2/2012 | Hurme et al. | |
| 2012/0187185 A1 | 7/2012 | Sayan | |
| 2012/0203708 A1* | 8/2012 | Psota | G06Q 30/02 705/347 |
| 2012/0271773 A1 | 10/2012 | Pieri | |
| 2012/0275640 A1* | 11/2012 | Widzinski | G06K 9/00577 382/100 |
| 2012/0316981 A1* | 12/2012 | Hoover | G06Q 30/06 705/26.4 |
| 2013/0320079 A1* | 12/2013 | Nordin | G06K 5/00 235/375 |

FOREIGN PATENT DOCUMENTS

| | | |
|---|---|---|
| JP | 2008545282 | 12/2008 |
| KR | 1020070020680 | 2/2007 |
| KR | 1020120115183 | 10/2012 |
| KR | 1020120128002 | 11/2012 |
| WO | 2005088533 | 9/2005 |
| WO | 2006016112 | 2/2006 |
| WO | 2006016114 | 2/2006 |
| WO | 2006084090 | 8/2006 |
| WO | 2007012815 | 2/2007 |
| WO | 2007012816 | 2/2007 |
| WO | 2007012821 | 2/2007 |
| WO | 2012037617 | 3/2012 |
| WO | 2012177845 | 12/2012 |

OTHER PUBLICATIONS

Japanese Office Action from Patent Application No. 2015/553832, dated Aug. 2, 2016, Amazon Technologies, Inc., Pages.

Extended European Search Report for Application No. 14740506.2, dated Jul. 7, 2016, Amazon Technologies, Inc., pp. 1-10.

Office Action from Korean Application No. 10-2015-7002014, dated Oct. 10, 2016 (English Translation and Korean Version), Amazon Technologies, Inc., pp. 1-17.

* cited by examiner

UNAUTHORIZED PRODUCT DETECTION TECHNIQUES

BACKGROUND

Retailers, wholesalers, and other product handlers (which may collectively be referred to as handlers) typically maintain an inventory of various items that may be ordered by clients or customers. Similarly, item providers, such as manufacturers may maintain an inventory of parts and/or materials for use in manufacturing processes. This inventory may be maintained and processed at a materials handling facility which may include, but is not limited to, one or more of: standalone warehouses, warehouses attached to retail locations, distribution centers, cross-docking facilities, order fulfillment facilities, packaging facilities, shipping facilities or other facilities or combinations of facilities for performing one or more functions of material (inventory) handling. In some cases, inventory is received from and/or maintained on behalf of a third party.

It can be difficult for such distributors and manufacturers to detect whether any of the items they receive and/or handle on behalf of others are unauthorized items (e.g., counterfeit, stolen or gray market items), even when the items are in their possession. For example, a single distributor or manufacturer may receive a large number of vastly different types of items, and may not be familiar enough with some of them to be able to detect unauthorized items based on their appearance. Furthermore, unauthorized items may be or appear (e.g., even to a trained eye) to be identical to the corresponding authentic items.

Reactive approaches to reducing the risk of using unauthorized items in manufacturing or distributing unauthorized items to retailers or consumers may not be adequate. For example, unauthorized health products and/or consumable items (such as counterfeit cosmetics or food items) could contain ingredients other than those found in the authorized items. In another example, unauthorized manufacturing parts may not meet design specifications, which may cause the final manufactured products to fail or to be unsafe.

Figure 1:
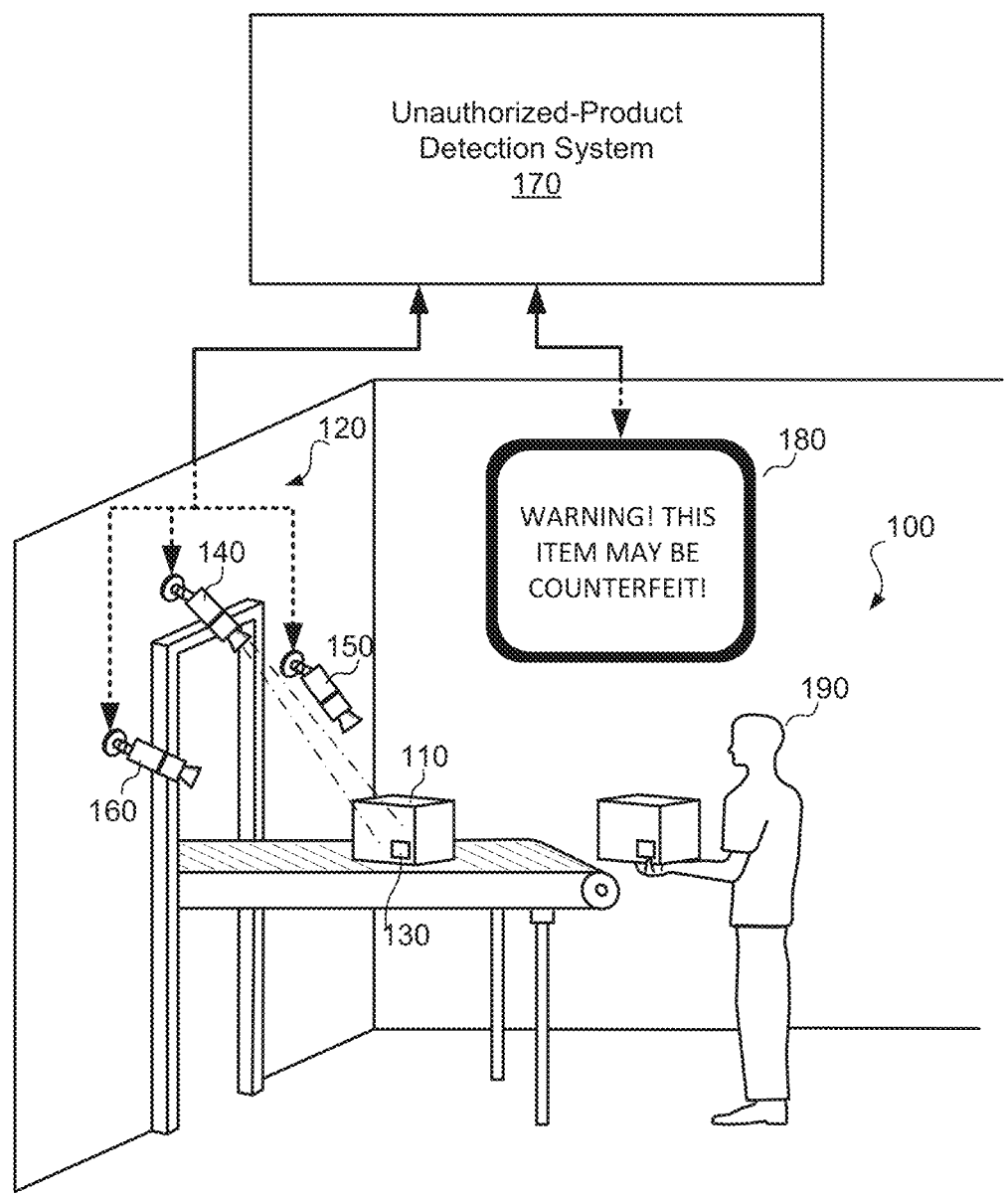
FIG. 1 is a block diagram illustrating a portion of a materials handling facility, according to one embodiment.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

An unauthorized-product detection system may be used to detect unauthorized (e.g., counterfeit, stolen or gray market) items. In some embodiments, the use of such an unauthorized-product detection system may reduce the risk of passing counterfeit or gray market products to consumers, wholesale customers, retailers, or other members in a supply-chain. In some embodiments, the unauthorized-product detection system may be configured to analyze data representing "authentication markers" located on various items and their packaging presumed to have been produced or sourced by a particular provider (e.g., a particular manufacturer or supplier). In general, an authentication marker may include an item-specific or shared identifier that is difficult to forge, detect and/or reproduce. In addition, the authentication marker may include an item-specific or shared identifier that is not particularly difficult to forge, detect, and/or reproduce, but whose usage is tracked by the unauthorized-product detection system to determine whether unauthorized instances or copies of the authentication marker have been applied to items that were not produced or sourced by a particular manufacturer or supplier (e.g., counterfeit items).

In some embodiments, each valid authentication marker may be a unique identifier of a respective item. For example, in some embodiments, a unique long random number may be applied as a barcode (or using another type of encoding) onto each individual item (or its packaging) at a manufacturer's facility to create an identifier (or authentication marker) that is unique to that instance of the item. In other embodiments, a long random number or pattern (or another type of identifier that serves as an authentication marker) may be printed or otherwise applied (e.g., using a sticker or other type of labeling) on an item or its packaging directly, rather than in an encoded format. In still other embodiments, authentication markers may be inherent physical characteristics of the items or their packaging. At least some types of authentication markers may be subsequently identified in an image of the item (e.g., by capturing the image using a high-resolution image sensor embodied in a camera and/or by post-processing the image of the item to identify the authentication marker(s)).

In some embodiments, the unauthorized-product detection system may include or have access to a data store of data representing valid authentication markers that were applied by item providers and/or authentication markers located on items received from other entities that handle items, and may store tracking information reflecting the use of those authentication markers. For example, in some embodiments, authentication markers may be generated for and applied to items or their packaging by the manufacturer (e.g., during or subsequent to the manufacturing process). Data representing those authentication markers may then be stored in a data store to facilitate unauthorized product detection and/or for other purposes. In other embodiments, high-resolution images of an item (or a pre-determined portion of an item or its packaging) may be captured and stored in the data store to facilitate unauthorized product detection and/or for other purposes. For example, paper fibers in a designated area of an item or its packaging may be visible in a high-resolution image of the item (or may be discernible in the image using post-processing). In some embodiments, data representing such an image may serve as an authentication marker for the item instead of, or in addition to, a long random number.

In some embodiments, data representing various authentication markers on items received at a materials handling facility (some of which may be encrypted) may be captured using acquisition components such as high-resolution image sensors, scanners (e.g., barcode scanners or Radio Frequency Identifier ("RFID") scanners), or other devices, and may be communicated to the unauthorized-product detection system for analysis. For example, in some embodiments, data representing authentication markers may be captured as part of an inbound process at a receiving station in a materials handling facility. The unauthorized-product detection system may be configured to compare the data captured from received items that are presumed to have been produced or sourced by a particular manufacturer or supplier with data stored in the data store that represents valid authentication markers of items produced or sourced by that manufacturer or supplier. In some embodiments, determining whether an item is likely to be a gray market or counterfeit item may include determining whether a matching authentication marker is found in the data store.

In some embodiments, an unauthorized-product detection system storing data representing valid authentication markers for items produced or sourced by a particular manufacturer may be maintained by the manufacturer itself. As such, an item handler such as a retailer may query the status of items over a network. In other embodiments, such a system may be operated by an entity that operates a materials handling facility. In this example, the item provider may upload valid authentication markers over a network to the entity and the entity can use the system to validate the authenticity of received items. In addition, in at least one embodiment the unauthorized-product detection system can be operated as a web service by a trusted third party that provides unauthorized product detection services and/or maintains the data store on behalf of entities in the item ecosystem. An unauthorized-product detection system operated as a web service may provide various unauthorized product detection services to consumers, wholesale customers, vendors whose products are handled by a third party materials handling facility, retailers, distribution centers, materials handling facilities, and/or other supply-chain members. For example, the web service can expose interfaces for item providers, item handlers and item consumers. In an example embodiment, item providers can use application program interfaces ("APIs") to register or revoke authentication markers, configure the service (e.g., configure it to monitor authentication markers on a per-item type basis, set constraints, set the kinds of information to collect and use to determine whether authentication markers are authentic, etc.), query the authenticity of registration markers or obtain reports. Item handlers and/or consumers may have access to the above functions or a subset thereof. For example, an item handler and/or a customer may not be authorized to register or revoke authentication markers or set constraints on how the system operates.

As noted above, an unauthorized-product detection system may be utilized in various types of materials handling facilities to reduce the risk of passing unauthorized products to consumers, wholesale customers, retailers, or other members of a supply-chain. FIG. 1 is a block diagram illustrating a portion of one such materials handling facility, according to one embodiment. As illustrated in this example, a materials handling facility may include a receiving station 100, components of which may communicate with an unauthorized-product detection system 170, which can be operated by the provider of the item, the materials handling facility, a web service provider, etc. As described in more detail herein, unauthorized-product detection system 170 may be configured to determine whether items received at receiving station 100 are authorized (e.g., that they were produced or sourced by the manufacturer by whom they were presumed to have been produced or sourced) or are likely to be unauthorized items.

In this example, an acquisition component 120 including three mounted cameras (shown as 140, 150 and 160) are attached to respective sides of a portal through which items are received at receiving station 100 on a conveyor belt, and these cameras are positioned so that they capture video or still images of different sides of the items and/or their packaging as they are received. For example, camera 140 is positioned to capture an image of at least a portion of the packaging 110 for an item, and the packaging 110 that is in the field of view of camera 140 includes an authentication marker 130 located on a particular corner of one side the packaging 110. In some embodiments, data representing the image captured by an image sensor of the camera 140 may be communicated by the camera to unauthorized-product detection system 170 for analysis or may be communicated to unauthorized-product detection system 170 through a control system or other component of the facility or the unauthorized-product detection system (such as the control system described in FIG. 10). As described in more detail herein, the unauthorized-product detection system 170 may be configured to generate and/or provide an indication of whether item 110 is likely to be authorized or is likely to be a counterfeit item or a gray market item and provide an indicator to the requestor. For example, unauthorized-product detection system 170 can send the indicator to the control system or directly to a display 180, which in turn can display information indicating whether the item is authorized or unauthorized to an agent 190. As illustrated in FIG. 1, the indicator in this example is a message indicating that a recently scanned item (e.g., item 110, is suspected to be counterfeit).

As described above, an authentication marker for an item that is suitable for use in a counterfeit or gray market product detection operation may include a unique identifier of the item. In some embodiments, this unique identifier may not be apparent to a casual observer, making it difficult to extract (and thus difficult to copy). For example, a particular pattern of the fibers in the item or its packaging (e.g., the particular way that the fibers in the item or its packaging, wrapping paper on a box or in the box itself lie and/or are cut in a designated portion of the item or its packaging) may be used as an authentication marker for the item. In other examples, an authentication marker may be applied to an item or its packaging to create a unique signature (or fingerprint) for the item using an invisible ink, a subtle (but visible) watermark or a digital watermark (i.e., a mark that is embedded on the item or its packaging that is discernible in an image of the item following post-processing using image analysis software, but is not discernible with the human eye). As described in more detail herein, any of these or other types of authentication markers may include or encode identifiers of a manufacturer, a brand, a product line, an item type, a lot, a date or timestamp code, and/or an individual item instance, in various embodiments.

Figure 2A:
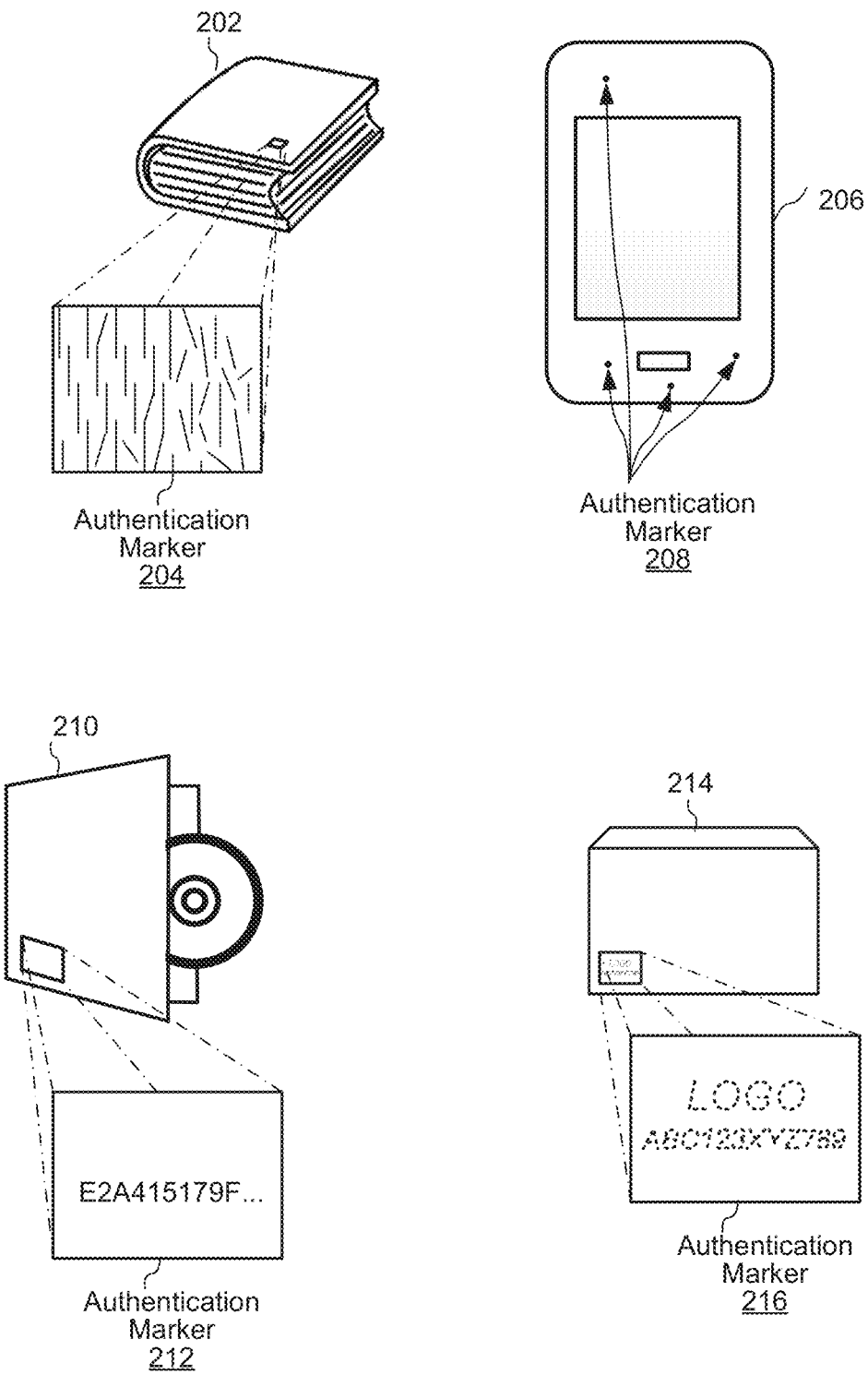
FIG. 2A illustrates examples of authentication markers of different types, according to various embodiments.

For example, FIG. 2A illustrates four authentication markers of different types, according to various embodiments. Item 202 includes an authentication marker 204 that is based on inherent physical characteristics of the item 202, such as a fiber pattern of a material of the book's cover. Here, a high-resolution image of an area designated as the authentication marker area can reveal the fiber pattern, which can be used as an authentication marker 204 for the item. In various embodiments, this authentication marker area may be a pre-determined location on the item or its packaging or an unauthorized-product detection system (or an authentication marker acquisition system including image post-processing and analysis components) may be configured to discover and extract the authentication marker 204 from a high resolution image of the item or the authentication marker area. For example, the designated authentication marker area may be bounded by a particular border pattern that may or may not be visible to the human eye or may include another indicator that can be detected by the unauthorized-product detection system (or an image post-processing and analysis component) to identify the area as a designated authentication marker area.

Continuing with the description of FIG. 2A, in addition to fiber patterns of the material used to create items or their packaging, patterns formed by inherent physical characteristics that naturally occur during the manufacturing process or are intentionally manufactured into items or item packaging can also be used as authentication markers. For example, item 206, a tablet computing device, includes an authentication marker 208 that is based on features of the item 206. In this example, the item producer may have intentionally manufactured protrusions, into item 206 to create a unique pattern. In other embodiments, the manufacturing process used by an item provider may naturally or intentionally cause color or indentations to occur in different places on the item or the item packaging. The item provider may also apply stamps, brands or apply digital watermarks that are generally imperceptible to humans to the item or the item packaging. In addition, in some embodiments an item provider may add burn marks and/or remove portions of material from an item or the item packaging to create one or more holes and the pattern of the holes or the pattern defined by a hole could be used as an authentication marker. Similar to the example fiber pattern based authentication marker, an unauthorized-product detection system (or an image post-processing and analysis component) may be configured to discover and extract patterns formed by inherent physical characteristics from captured images of the items and use them as authentication markers.

As described above, in addition to inherent characteristics based authentication markers, the unauthorized-product detection system can use identifiers attached to items or their packaging. For example, item 210, a DVD® or Blu-Ray® disc, includes an authentication marker 212 that is based on a unique, long, alphanumeric identifier that has been generated randomly or specifically for item 210 and applied to the item or its packaging. In other embodiments, an authentication marker 212 may represent a unique numeric identifier (such as a serial number), or a composite numeric or alphanumeric identifier, different portions of which may represent an identifier of a manufacturer, a brand, a product line, an item type, a lot, a date or timestamp code and/or an individual item instance.

Item 214 shows that an authentication marker 216 can be represented by a digital watermark that includes information such as an identifier, a pattern, a company logo and/or an encrypted item identifier. As discussed previously, the digital watermark may be visually imperceptible by the human eye. As in the previous example, the encrypted item identifier portion of authentication marker 216 may represent a unique, long, alphanumeric identifier that has been generated randomly or specifically for item 214 and applied to the item or its packaging. In other embodiments, the encrypted item identifier portion of authentication marker 216 may represent a unique numeric identifier (such as a serial number), or a composite numeric or alphanumeric identifier, different portions of which may represent an identifier of a manufacturer, a brand, a product line, an item type, a lot, a date or timestamp code and/or an individual item instance.

Figure 2B:
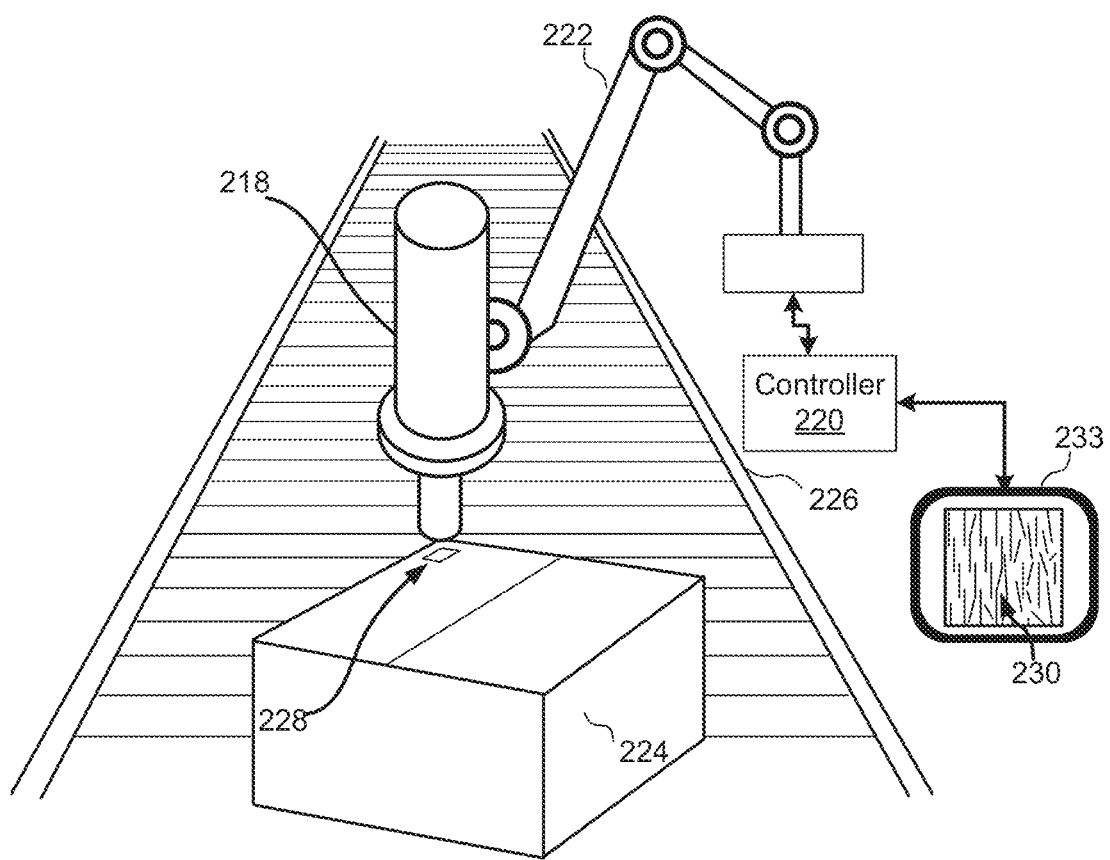
FIG. 2B shows a portion of a facility including an example acquisition component, according to various embodiments.

FIG. 2B shows a portion of a facility including an example acquisition component configured to capture authentication markers. In the illustrated embodiment, the acquisition component includes a camera system 218 with a controller 220 and a mechanical arm 222. Note that the controller 220 may be located at a different location than the camera system 218 and can be coupled to the camera system 218 and the mechanical arm 222 via a network. In this embodiment, the camera system 218 can generate a video feed that can be used by the controller 220 to move the camera system 218. As item 224 moves on the conveyor belt 226 the controller 220 can move the camera system 218 into position to capture a high-resolution image of authentication marker 228. Once captured, the camera system 218 can send the image of a representation of authentication marker 230 to the controller 220, which can be optionally displayed on a display 233 so an agent can confirm that the representation of the authentication marker 230 was successfully captured. As described in more detail in the following paragraphs, the representation of the authentication marker 230 can then be sent to an unauthorized-product detection system for registration or analysis, via the network. In various embodiments, the area containing authentication marker 228 may be a predetermined location on the item 224 or its packaging. For example, the authentication marker area could be a set location on the item or the item packaging. In the same or another configuration, the controller 220 may be configured to detect the area where the authentication marker 228 is located from the video feed. The area containing the authentication marker 228 may be bounded by a particular border pattern that may or may not be visible to the human eye or may include another indicator that can be detected by the controller 220 so that a high resolution image can be acquired. While FIG. 2B shows the acquisition component as including a separate controller 220, this is an optional configuration and in alternative configurations the camera system 218 and controller 220 can be integrated within the same physical housing. In addition, the acquisition component may be a hand-held device that can be operated by agent and can include the camera system 218 and controller 220. In this configuration, the agent can position the camera system 218 to capture high-resolution images of authentication markers.

In addition to the illustrated authentication markers others can be used. For example, an authentication marker can be a standard (i.e., one-dimensional) barcode such as a two-dimensional (2D) or matrix type barcode. In these examples, each of the barcodes may represent a unique, long, alphanumeric identifier that has been generated randomly or specifically for items or their packaging, respectively, and applied to those items or their packaging. In other embodiments, each of these barcodes may represent a unique numeric identifier (such as a serial number), or a composite numeric or alphanumeric identifier, different portions of which may represent an identifier of a manufacturer, a brand, a product line, an item type, a lot, a date or timestamp code and/or an individual item instance.

In some embodiments, an authentication marker for an item may not be a visual marker that is detectable from a high-resolution image, but may be a marker detectable using another mechanism. For example, a RFID tag that is detectable using an RFID scanner. In this example, the RFID tag has been applied to this item or its packaging to serve as an authentication marker. In some embodiments, data transmitted by such an RFID tag may represent a unique, long, alphanumeric identifier that has been generated randomly or specifically for an item and the data may be digitally signed with a key and/or encrypted. In other embodiments, the signal emitted by the RFID tag may represent a unique numeric identifier (such as a serial number), or a composite numeric or alphanumeric identifier, different portions of which may represent an identifier of a manufacturer, a brand, a product line, an item type, a lot, a date or timestamp code, and/or an individual item instance. Note that in various embodiments, an RFID tag that serves as an authentication marker for an item may be applied as an external sticker on an item or its packaging, or may be placed inside the item or its packaging, where it may be read by a scanner (through its packaging) even though it may not be visible (not shown). X-ray images of the interior of items or packages, spray-on designs, material that degrades or changes color with age (such that the unauthorized-product detection system can determine whether the item is the expected age) or holograms can also be used as authentication markers.

Multiple techniques described herein may be combined for use by an unauthorized-product detection system (or a service provided thereby). For example, in some embodiments, different authentication marker types may be layered to provide more robust unauthorized product detection (e.g., one type of authentication marker may be applied to an item and another type of authentication marker may be applied to its packaging, or two different types of authentication markers may be applied separately or may be encoded together and applied on an item or its packaging). In addition, in some embodiments an item may have multiple authentication markers and each authentication marker may be valid for a specific amount of time. For example, an item may include a plurality of authentication marker locations (e.g., two, four, five etc.) wherein each location may include one or more authentication markers. If the item is, for example, manufactured in the first quarter of a certain year, an authentication marker from a first location can be used. Similarly, if the item is manufactured in the third quarter, an authentication marker from a second location can be used. In this example, the unauthorized-product detection system can use the current time and information about the item that indicates when each marker is valid to determine whether an item is authorized. This can include a determination of the accuracy of a representation of the timing of the manufacturing of the item. Similarly, in some embodiments where an item includes a plurality of authentication markers, the active authentication marker on the item or the item packaging can be changed to make it difficult to counterfeit authentication markers and to attempt to identify unauthorized entities that are counterfeiting authentication markers. Here, an unauthorized-product detection system can change which authentication marker on the item is active and communicate the identity of the new authentication marker to trusted entities that handle the item, such as entities on a white-list. In this example embodiment, the unauthorized-product detection system can make a change based on a variety of factors. For example, the authentication marker can be changed periodically, randomly or based on the occurrence of an event, such as if an authentication marker is compromised. After one of the authentication markers is activated and the previously active authentication marker is deactivated, the unauthorized-product detection system can communicate the identity of the activated authentication marker to trusted entities on the white-list. In the instance that the unauthorized-product detection system receives a representation of a deactivated authentication marker, the system can send a response indicating that the authentication marker is invalid and store information such as the identity of the requestor, the location of the request and any other information determinable from the request in a data store. In the instance that the request comes from a purported trusted entity the unauthorized-product detection system may send a notification to an administrator associated with the entity indicating that the entity's credentials may be compromised.

In addition, in some embodiments entities that take possession of an item at some point in the supply-chain, such as bailees, retailers, wholesalers or distributors may also apply an authentication marker to the item or the item packaging. For example, a bailee and a distributor may burn a mark into the item packaging and register the pattern created by the burn as an authentication marker with an unauthorized-product detection system. When a retailer takes possession of the item the authentication markers applied by the item provider as well as the bailee and distributor can be validated. In other embodiments, one or more of the authentication markers described herein may be used in combination with various encryption techniques, such as those described in more detail below. In one specific example, data representing a digital watermark or a unique fingerprint produced by a manufacturing process (e.g., data that was produced by encoding or converting a digital watermark or unique fingerprint into a number) and that is to be applied on the outside of the item or its packaging may be provided to a web service that would cryptographically sign it with a key and return an encrypted identifier that could be placed inside the item or its packaging. In this example, an entity that receives the item may unpack it, discover the signed number inside, decrypt the signed number, and determine whether it matches the number equivalent of the watermark or fingerprint that was applied on the outside of the item or its packaging. In other embodiments, a similar technique may be applied to encrypt other types of authentication markers (e.g., a serial number may be hashed with a given key).

As described above, in various embodiments, an item producer may create and/or apply authentication markers to the items it produces and/or sources. The authentication markers may then be registered with an unauthorized-product detection system so that other parties in the stream of commerce can determine whether a given item is a likely to be a counterfeit or gray market good.

Figure 3A:
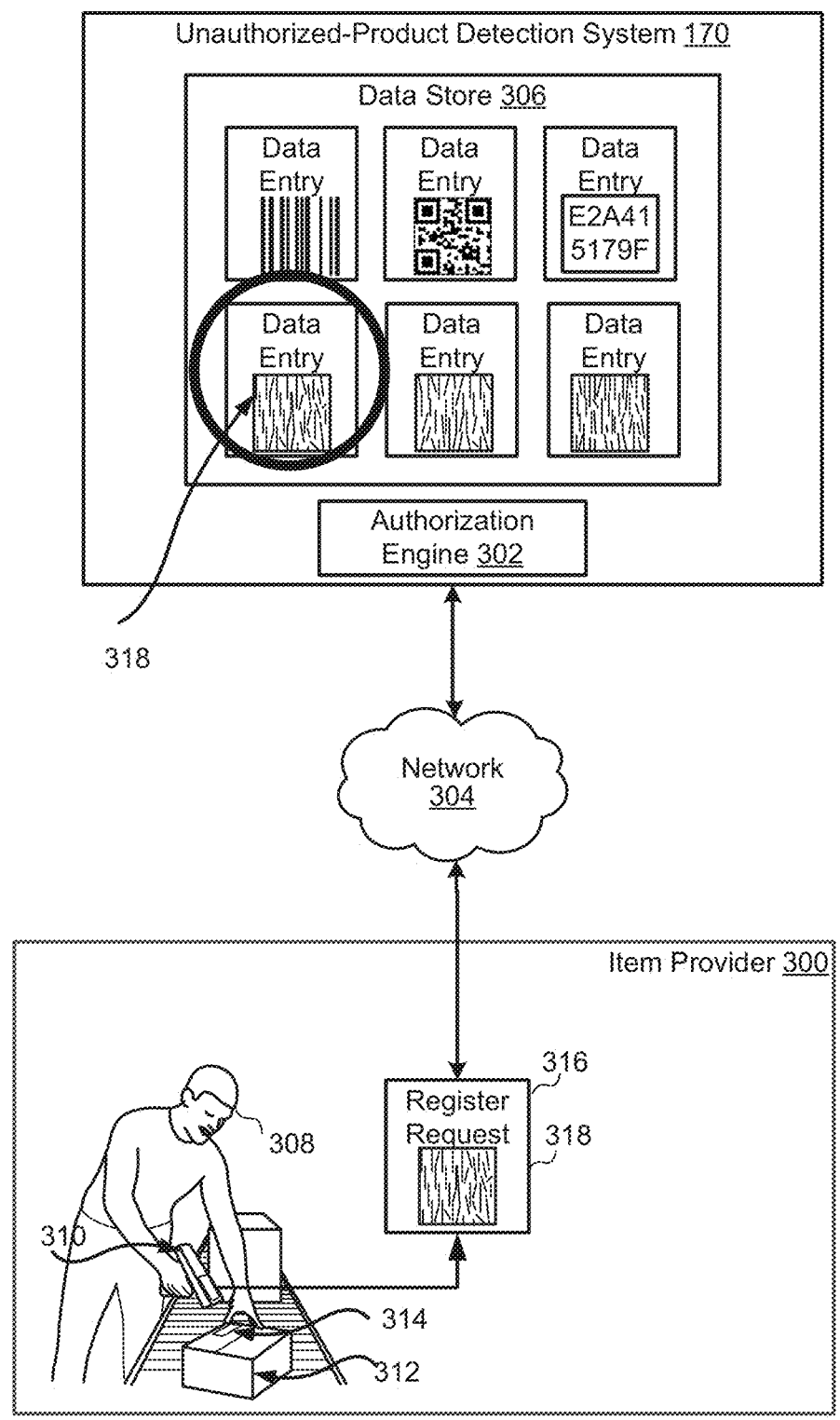
FIG. 3A and FIG. 3B illustrate a system that provides network-based unauthorized product services to clients, according to one embodiment.
Figure 3B:
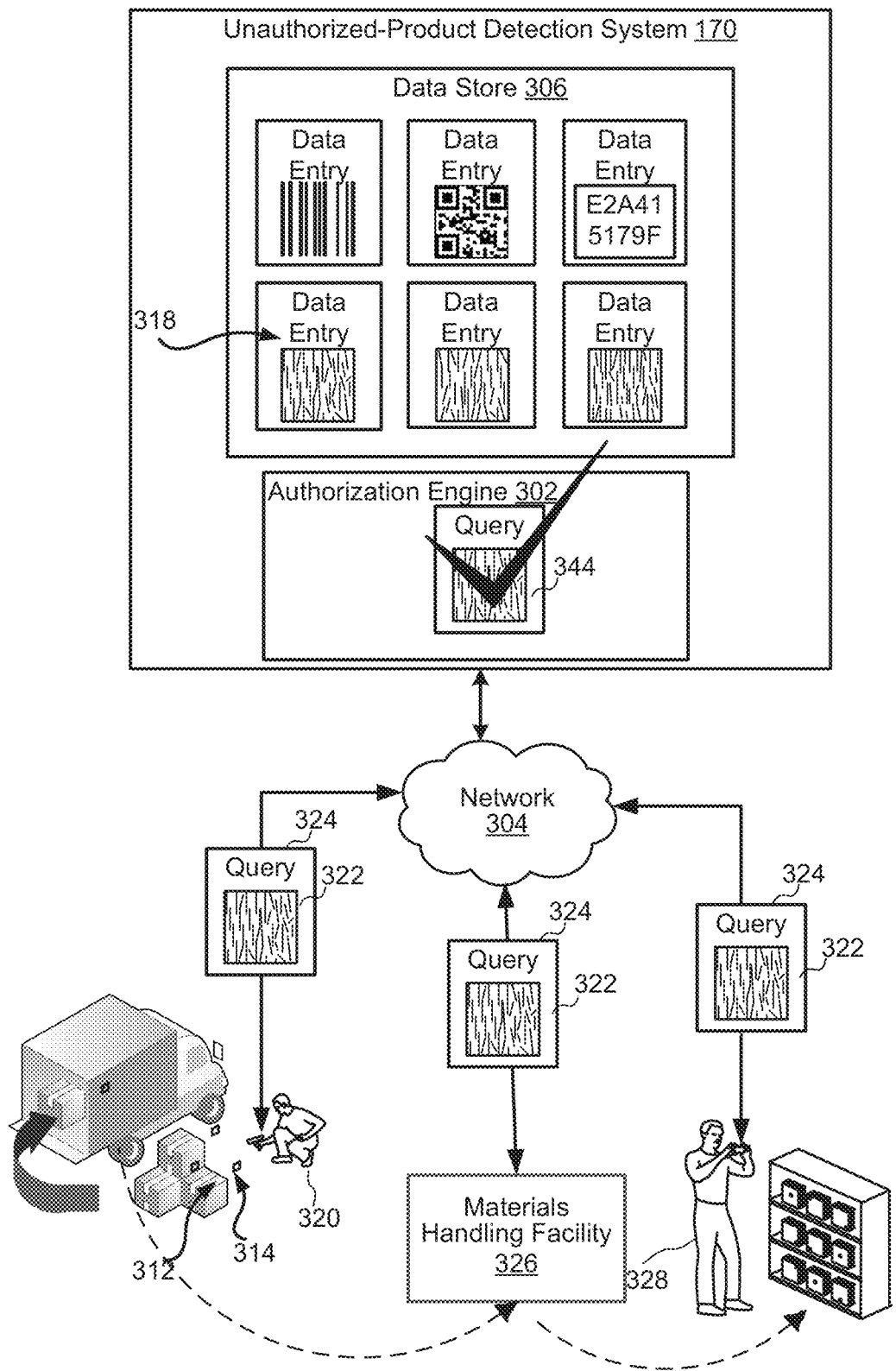

Turning to FIG. 3A and FIG. 3B, they illustrate example components of an unauthorized-product detection system 170 and how item producers, handlers and consumers may use such a system. In this example, unauthorized-product detection system 170 can be configured to register authentication markers from one or more item providers, such as item provider 300, by storing data representing the markers in a data store 306 along with other data about the items (e.g., a serial number or other unique identifier of each item), an identifier for the provider of the item, etc. Once stored, the unauthorized-product detection system 170 can be used by consumers, such as consumer 328 of FIG. 3B, and item handlers, such as bailee 320 or agents of a materials handling facility 326, to verify whether items are authorized (e.g., non-counterfeit or non-gray market items.) In example embodiments, the functionality associated with registering authentication markers and verifying their authenticity can be effectuated by an authorization engine 302. While authorization engine 302 is shown as a single element, in various embodiments the functionality of authorization engine 302 can be distributed across multiple modules of executable code. In addition, authorization engine 302 is described as a single element merely for ease of explanation and in embodiments the authorization engine 302 can be distributed across multiple physical machines or even across multiple physical machines operated by entities.

In an embodiment, unauthorized-product detection system 170 can be configured to register and validate different kinds of authentication markers. As such, unauthorized-product detection system 170 can be configured to process different kinds of authentication markers, such as authentication markers that are based on inherent physical characteristics of an item or its packaging as well as unique long numbers, one-dimensional and multi-dimensional barcodes, digital watermarks, unique numeric or alphanumeric identifiers, RFID tags or another type of identifier that is printed or otherwise applied to items or their packaging. In addition, while data store 306 is shown as storing images of barcodes and images of inherent physical characteristics, this is merely for illustration purposes and in embodiments the data store 306 may store the data encoded in barcodes or the data representing patterns, s instead of, or in addition to, the images themselves. Like the authentication engine 302 described above, while data store 306 is shown as one store this is merely for illustration purposes and in an embodiment the data store can be distributed across multiple physical machines, operated by one or more entities.

Continuing with the description of FIG. 3A, an agent 308 of item provider 300 is using the inherent physical characteristics of item 312 or the item packaging as an authentication marker 314. Here, instead of using an acquisition component similar to the system illustrated in FIG. 1 (where authentication markers are acquired by a fixed camera system), the agent 308 is using a hand-held acquisition component 310 to capture high-resolution images of an authentication marker 314, which in the illustrated embodiment is a fiber pattern of a material of the item 312 or its packaging. Once a representation of the authentication marker 318 is acquired (e.g., a high-resolution image of an authentication marker area is captured by acquisition component 310) the item provider 300 can send a registration request 316 that, for example, includes the representation of the authentication marker 318 to the system 170 as well as other data that can be used to register the representation 318. For example, the acquisition component 310 (or a control system) can add data to the registration request 316 such as a serial number of the item 312, an Internet Protocol ("IP") address of the acquisition component 310 (or control system), a manufacturer identifier, a brand, a product line, an item type, a lot, a date or a timestamp code.

The registration request 316 can be sent to the unauthorized-product detection system 170 in various ways, depending on the embodiment. For example, in some embodiments, the unauthorized-product detection system 170 may be operated by the item provider 300 and connected to network 304, which in this case could be an internal network. Here, the acquisition component 310 may be able to directly send a registration request 316 to the system 170 or send a local request to a control system (not illustrated), which in turn can send the registration request 316 including a representation of an authentication marker 318 to the unauthorized-product detection system 170. In another configuration, the system 170 may be operated by a retailer, such as an entity that operates materials handling facility 326. As such, the acquisition component 310 may be configured to send the registration request 316 to the system 170 over the network 304, which in this case is the Internet. Alternatively, the acquisition component 310 can send the acquired representation 318 to a local request to the control system, which in turn can send the request 316 to the unauthorized-product detection system 170 over the Internet. In another embodiment, the unauthorized-product detection system 170 can be operated by a trusted third party that exposes the functionality of the unauthorized-product detection system 170 as a web service capable of receiving API calls to register authentication markers from acquisition components or control systems operated by one or more item providers. In an another configuration, an agent can use a web console provided by a web server associated with the unauthorized-product detection system 170 to log into the unauthorized-product detection system 170 to register authentication markers.

Regardless of whether the functionality of unauthorized-product detection system is accessed directly or exposed via a web service, once the registration request 316 is received it can be routed to the authorization engine 302. The authorization engine 302 can authenticate the registration request 316 and store the representation of the authentication marker 318 or a value representative of the pattern in the data store 306, as illustrated by the circle surrounding the data store entry for the representation of the authentication marker 318. In addition to storing the representation of the authentication marker 318, the authorization engine 302 can generate and store other information contained in the registration request or determined from data in the registration request in association with the representation of the authentication marker 318. For example, the information can include the identity of the item provider 300 submitting the request, a class identifier for the item (i.e. DVD, videogame, article of clothing, book, etc.), a brand, a product line, a lot, a date or timestamp code, an IP address of the device submitting the request, a physical location of the device submitting the request, etc.

After the representation of the authentication marker 318 is stored in the data store 306, and the item 312 is released into the supply-chain, item handlers and item consumers can send queries, such as queries 324 to the unauthorized-product detection system 170 to determine the status of item 312. Similar to a registration request, the queries 324 can include representations of authentication markers 322 located on items (or their packaging), the difference here is that instead of registering a representation of the authentication marker the authorization engine 302 can determine whether the received representations of authentication markers 322 appear to be valid and/or whether an item 312 that includes what appears to be a valid authentication marker is likely to have been produced by the manufacturer that is alleged (or presumed) to have produced the item. For example, the unauthorized-product detection system 170 can receive queries 324 and route them to the authorization engine 302, which can process the queries 324 and compare the representations of the authentication markers 322 in the queries 324 to representations of authentication markers stored in data store 306 and compute a confidence score representing how likely the received representation of an authentication marker is valid. As illustrated by the "check" in FIG. 3B, here the authorization engine 302 can compute a confidence score that indicates there is a high probability that the representation 318 stored in the data store 306 matches or is substantially similar to the representation of the authentication markers 322 from the queries 324. After determining a match, the authorization engine 302 may associate other information with the data entry for the representation of the valid authentication marker 318, such as information identifying the entity that sent the query, a timestamp, etc., and, depending on the configuration, respond to the queries 324 with an indicator, such as an acknowledgment or text indicative of a message indicating that the authenticity of the authentication marker has been verified.

As shown by the figure, one example item handler that may submit a query to the system is a bailee 320. For example, the bailee 320 is a party that takes possession of the item to transport it from one location to another. The bailee 320 may submit a query to the unauthorized-product detection system 170 prior to taking passion of an item, such as item 312 to verify the status of it. The bailee 320 may use an acquisition component, such as a scanner or a camera to acquire a representation of the authentication marker 322 and send it to unauthorized-product detection system 170. In one example configuration, after matching the representation submitted in the query 322 to an entry in the data store 306, authorization engine 302 may associate information with the data entry for the representation of the valid authentication marker 318, such as information indicating that item 312 is in possession of the bailee 320, that the authentication marker 318 is "in use," the IP address associated with the bailee's acquisition component, a timestamp of possession, etc. In addition, depending on the configuration, the authorization engine 302 may respond to the query from the bailee 320 with an indicator such as an acknowledgment or a message indicating whether the item is authorized or unauthorized. In addition, once the bailee 320 takes possession of the item 312 he or she may mark the item's packaging by branding it, stamping it or tearing or punching a hole in the item's packaging. That is, the bailee 320 could apply another authentication marker to the item and this marker can be verified by downstream parties that come into contact with the item.

The bailee 320 may transport the item 312 to a materials handling facility 326 or directly to a consumer 328. For example, the materials handling facility 326 may include an acquisition component similar to the one illustrated in FIG. 1, or some other acquisition component configured to interrogate items or their packaging to determine whether the item are authorized. Similar to the bailee 320, an agent of materials handling facility 326 can query the system 170 before taking possession of the item 326 to verify that the representation of the authentication marker 322 is valid, has not been recently acquired at other material handling facilities or should not be with the bailee 320. Similarly, the consumer 328 can check whether an item is authorized using a personal communication device, such as a tablet computer system or a mobile phone. In the consumer example, a shelving unit in the retail environment contains a variety of items such as CDs or DVDs, each of which can include an authentication marker. In this example, the consumer 328 can take a picture of a DVD (e.g., using a smart phone that includes a high-resolution camera and an application that provides an interface to the unauthorized-product detection service 170) to capture data representing an authentication marker of a DVD in order to check the DVD before purchasing it. As in previous examples, instead of a pattern, the representation of the authentication marker 318 may be a numeric or alphanumeric identifier, a digital watermark, a barcode, or another type of authentication marker, in different embodiments. As described in more detail herein, the data captured by consumer 328 via the personal communication device may be provided to the unauthorized-product detection system 170, which may attempt to determine whether the DVD is authorized or was even provided to the retailer offering the item for sale. As in other examples described herein, an indication of the result of that determination may be transmitted to the personal communication device for display (e.g., by the application that provides an interface to the unauthorized-product detection service) in order to provide timely (e.g., real time) feedback about the authenticity of the DVD to consumer 328, using any suitable display mechanism, including, but limited to, those described herein.

In some embodiments, an operator of the materials handling facility 326 may apply an unauthorized product detection process (or an authentication marker validation process thereof) to all items (or item packages) that are received at the materials handling facility 326 when they are received, when they are stowed, and/or after they have been placed in inventory. In other embodiments, these processes may be applied to received items on a periodic or random basis at various points in time (e.g., as an unauthorized-product detection spot check) and/or they may be applied to particular received items that are considered to be at higher risk of being counterfeit, as described in more detail below.

For example, in some cases, items that are received at the materials handling facility 326 or packages that contain a large number of unpackaged or individually packaged (and presumably identical) items may be subject to a spot check. In order to detect whether counterfeit or gray market items have been placed in a package having a valid authentication marker or mixed in with authorized items in an item package that includes a valid authentication marker, in some embodiments, the unauthorized product detection techniques described herein may be applied to at least some of the individual items contained in such item packages while not applied to others. For example, an unauthorized product detection spot check operation may be performed for a random sample of the items contained in such item packages when they are received, after they have been placed in inventory, or at any other time during which they are stored or handled in the materials handling facility. In some embodiments, the application of the unauthorized product detection operations described herein to such item packages may reduce the risk that counterfeit items are passed to consumers, wholesale customers, retailers, or other members of a supply-chain.

Figure 4:
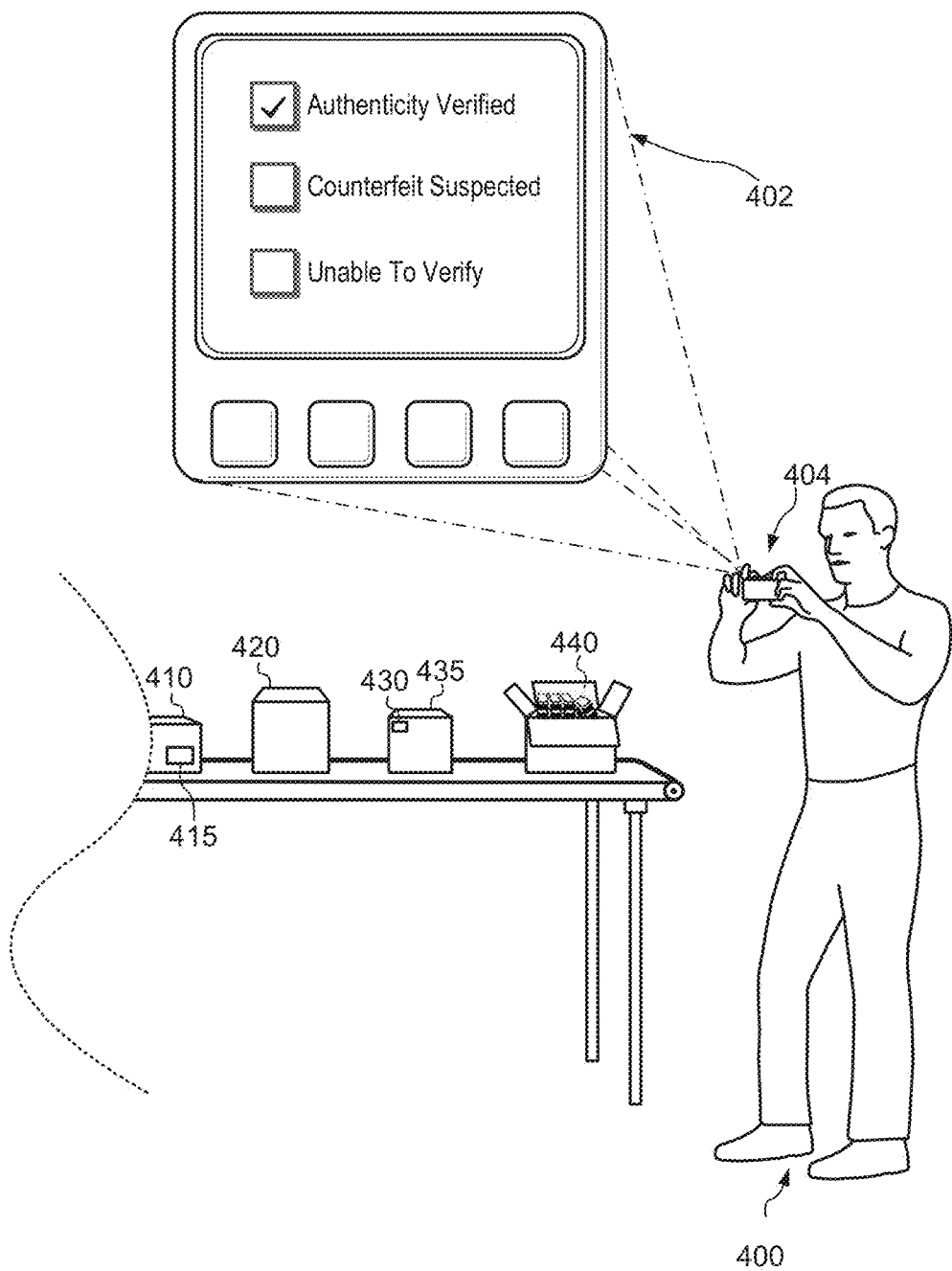
FIG. 4 illustrates an agent in a materials handling facility performing an unauthorized product detection operation and an example user interface, according to one embodiment.

FIG. 4 illustrates an agent 400 in receiving operation of a materials handling facility, such as materials handling facility 326, performing an unauthorized product detection operation on select items or on items after they are removed from their packaging, according to embodiment. For example, a control system may be configured to flag items for a spot-check or direct the agent 400 to check items that could not be verified using an acquisition component similar to the one illustrated in FIG. 1. In this example, several items and/or item packages are being transported within the facility on conveyor belt, at least some of which include authentication markers (e.g., on the items or their packaging). For example, item 410 includes an authentication marker 415, but no authentication markers are visible on items 420 and 440. Thus, items 420 and 440 have been flagged by the control system to be checked by an agent 400 because the manufacturers of items 420 and 440 configured the unauthorized-product detection system to monitor classes of items including items 420 and 440 and authentication markers could not be found. In this example, authentication marker 415 may be any type of authentication marker, including, but not limited to, any of the types described herein. For example, authentication marker 415 may include a burn pattern, a digital watermark, a unique numeric an alphanumeric identifier, a standard or 2D/matrix barcode, an RFID tag, or another type of identifier of item 410 that is applied to that item and that is visually detectable or discernible in an image of the item using image post-processing. In this example, the agent 400 has opened the packaging for items 440 and is acquiring their associated authentication markers using an acquisition component 404, such as a hand-held digital camera that includes an image sensor in order to determine whether the items 440 contained in the package are likely to be a counterfeit. In some embodiments, the agent 400 may use an acquisition component 404 such as a barcode scanner, an RFID scanner, or another type of scanning device that can be used to capture data representing authentication markers. Following the unauthorized product detection operation, an indicator 406 is presented in display 402 of acquisition component 404. In this example, the indicator 406 indicates that the authenticity of items 440 has been verified. In this example, the other possible indicators reflect that an item is suspected as being unauthentic, or that the unauthorized-product detection system was unable to verify the authenticity of the item. For example, in some embodiments, the returned indication may be expressed as an electrical signal (e.g., one that lights a red light or a green light on display 402 to indicate the results). In other embodiments, the returned indication may be expressed in a text format by data transmitted to and/or presented on a display of a communication device to indicate the results (e.g., "guaranteed authentic" or "60% likely to be counterfeit").

Note that while many of the examples described and/or illustrated herein involve materials handling facilities that handle items such as books, digital media, and electronic items that are typically packaged and purchased individually, in other embodiments, the unauthorized product detection operations described herein may be applied to consumables and other types of consumer or industrial items that are handled in a materials handling facility. For example, these techniques may be applied to detect counterfeit cosmetics, personal care items, packaged food products, food ingredients, mechanical parts for consumer or industrial use or in general any type of item handled in a materials handling facility of any type for which an authentication marker can be generated and/or applied (e.g., to the item or its packaging). These techniques may also be applied to detect counterfeit items that are sold in bulk or by whole lots (e.g., by the case, or pallet).

Figure 5:
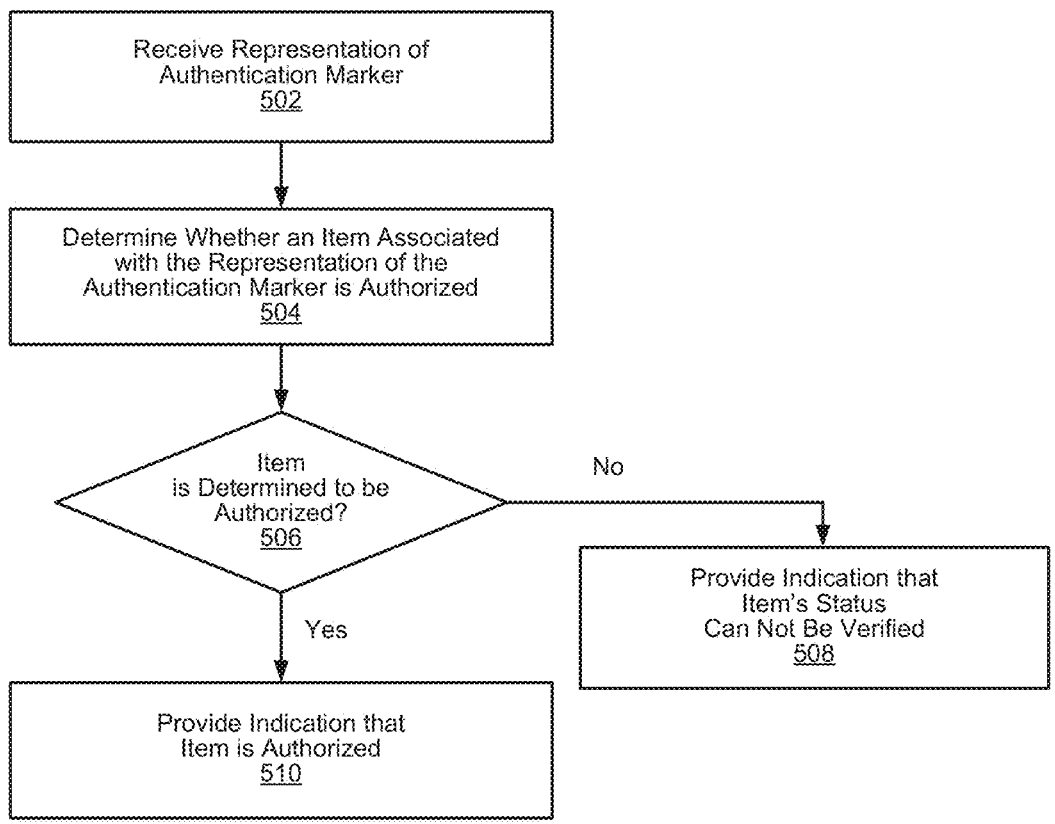
FIG. 5 is a flow diagram illustrating one embodiment of an operational procedure for performing unauthorized product detection.

Turning now to FIG. 5, an example operational procedure performable by an unauthorized-product detection system is illustrated. As illustrated, operation 502 shows that the unauthorized-product detection system can be configured to receive data representing an authentication marker that was detected on an item. For example, in various embodiments, the data may be received from an acquisition component that communicates directly with the unauthorized-product detection system (e.g., locally) or may be received from a control system associated with a remote entity (e.g., a materials handling facility in which the data was captured before it was transmitted or otherwise made available to the unauthorized-product detection system). As described in more detail elsewhere, the unauthorized-product detection system can include or be associated with a web server configured to process Hypertext Transfer Protocol ("HTTP") requests relating to authentication markers. In response to receipt of such an HTTP request, the web server can strip off the HTTP headers and route the request to an authorization engine. After receipt of the request and turning to operation 504, it shows that the unauthorized-product detection system can determine whether an item associated with the representation of the authentication marker is authorized. Various techniques for making such a determination are described in more detail herein, according to different embodiments.

If it is determined that the item is likely to be an unauthorized item (shown as the negative exit from 506), the unauthorized-product detection system can provide an indication that the authenticity of the item is suspect, as shown by operation 508. Otherwise (shown as the positive exit from 506), the operational procedure may include returning an indication that the authenticity of the item has been verified, as shown by operation 510. In some embodiments, these indications may be returned to the source of the data (e.g., to the entity from which the data representing the authentication marker was received) and/or may be communicated to the presumed manufacturer for tracking purposes (whether or not the item was determined to be authentic). In various embodiments, the returned indications may be communicated to the data source and/or the presumed manufacturer individually or along with return indications corresponding to one or more other unauthorized product detection operations (e.g., as aggregated data).

As described in previous examples, the indications returned to the data source and/or the presumed manufacturer may take any of various forms and can include any information that can convey information such as whether the authentication marker is suspect, verified, etc. For example, the indication or indicator can include one or more sounds, colors, signal levels (e.g., two different voltage levels or two signals that have different periods), an electronic signal representing a binary response (e.g., a "yes" or "no" answer to the question "is this item authentic?"), or that of a numerical value indicating the likelihood that the item is counterfeit (or, alternatively, that it is authentic). In some embodiments, the results of a detection operation may be returned to the requestor and/or the presumed manufacturer in the form of an electronic communication or report document, or a list of items that were verified and/or certified may be provided as a printout or as a display on a communication device (e.g., one through which the data representing one or more authentication markers was received). In some embodiments, items that are received at a materials handling facility directly from the manufacturer, as well as items that have been verified as being authorized after being received by the materials handling facility, may be adorned with a sticker or another type of label indicating that they are "certified authentic" or indicating another similar designation. Similarly, labels can be used by a web-based fulfillment service to indicate that an item was certified to be authentic. For example, the web-based fulfillment service may maintain a catalog of items and use a web server to serve item detail pages for the items to customers. The item detail pages can include information about the item, the item provider, customer recommendations as well as a label indicating that the item was certified authentic.

Note that the operations applied to determine whether an item is likely to be authorized or is a counterfeit/gray market item may be dependent on the types of authentication markers used to identify the item and/or on the operations applied by the system to track the use of those markers. For example, if each authentication marker is unique to a specific item instance and is difficult to reproduce, once it is determined to be a valid authentication marker, there may be little or no advantage gained by counting the number of times that the authentication marker is used, since unauthorized reproductions of the marker are unlikely to be produced. However, if an authentication maker is shared between multiple items (e.g., multiple items of the same type, brand, or product line) and/or if the authentication marker is relatively easy to reproduce, the unauthorized-product detection system may be configured to track the use of that marker to determine whether unauthorized reproductions of the marker have been produced and applied to counterfeit items. For example, if the authentication markers used on the packaging of all items produced by a particular manufacturer are unique or are difficult to reproduce because they are based on a special source of paper that is difficult or expensive to acquire, it may not be necessary to track the number of times that an authentication marker is observed on items that are presumed to have been produced by that manufacturer. However, if the authentication markers are similar or easy to reproduce, (e.g., other manufacturers have access to the same paper source) adding an additional authentication marker to the items or their packaging (e.g., a unique number or a digital watermark) may add another layer of information that can be used to determine whether unauthorized items are being produced and inserted into the supply-chain. As previously noted, in some embodiments, the specific random positions of the paper fibers in particular item packages that occur as a results of the manufacturing/packaging process may be used as a unique fingerprint per item instance.

In general, the inputs to an unauthorized product detection operation (or an authentication marker validation process thereof) may include captured data representing any type of authentication marker and/or other identifying information for the item in question. For example, the inputs (which may include information represented by the authentication marker itself) may include one or more of: an item type identifier, a lot number, a serial number, a date or timestamp code, a photographic image, or other identifying information and similar information may be stored in a data store in association with an identifier of each authentic item produced by the presumed manufacturer (e.g., for comparison and tracking purposes). For example, in some embodiments, a data store may store information about the source of all items produced by those manufacturers and the authentication markers for those items, and may record a history of each item as it moves through the supply-chain and is verified as authentic by each item handler in the supply-chain. In some embodiments, items that are expected to be moved through the supply-chain together may be tracked as a group. For example, data representing an authentication marker (or another identifier) on a pallet may be stored in the data store in association with information about all of the items or item packages that are supposed to be on or in it, and movement of the pallet and the items or item packages on it may be tracked by capturing the authentication marker of the pallet each time it is received at a new location or functional station. As such, the data store can be configured to generate and store relationships between authentication markers so that an authentication marker for an individual item can be related to an authentication marker for the crate or pallet that the item is transported in. In addition, in some embodiments, supplemental data is collected indicating that an item has been separated from the group it is associated with. For example, a container of items could include a sensor that indicates or detects when the lid or door of the container is opened. In an embodiment where the sensor is an electronic sensor, the electronic sensor may also record this supplemental data in non-volatile memory and/or send the supplemental data to the unauthorized-product detection system. In an embodiment, the unauthorized-product detection system can store an indication in the data store that now the items in the container may be separated from the group. This in turn could influence a confidence score calculation for a given item. For example, the unauthorized-product detection system can determine that an item that was earlier associated with the group can be in a location different from the group, when the sensor indicates that the lid or door was opened. Similarly, if the sensor indicates that the lid or door was not opened, the unauthorized-product detection system can determine that an item in the group should not be in a location different than the group.

As previously noted, in some embodiments, the authenticity of items may be verified down to each individual instance in addition to (or instead of) at the package level (e.g., for item packages that contain multiple instances of small items), the case level, or the pallet level. For example, the authenticity of the items may be verified at multiple layers by first validating an authentication marker on a pallet, and then on a case and/or box, and finally by opening the case and/or box and capturing the authentication markers of some or all of the items contained therein. In some embodiments, it may be difficult or inconvenient to apply certain types of authentication markers to specific types of individual items. Therefore, in some cases, the authenticity of the items may only be verified at levels higher than that of the individual item instance. In some embodiments, for small items and/or items on which (for various reasons) it may be difficult to apply printed or stickered authentication markers (e.g., certain types of plastic jewel cases), other types of authentication markers may be applied to the items, to their packaging, or to containers that include multiple instances of the items.

In some embodiments, it may be relatively easy to apply a unique identifier to an item, but it may be difficult or inconvenient to capture that information during the normal handling of items in a materials handling facility. For example, each DVD in a materials handling facility may have a unique serial number on it, but the serial number may not be detectable while the DVD is in its box (which may include an authentication marker that is much easier to access and to reproduce). Therefore, in some embodiments, it may be prudent to spot check DVDs (e.g., by opening up the boxes for a random sample of the DVDs) to verify their authenticity using the unique serial numbers on the DVDs themselves. In such embodiments, the unauthorized-product detection system may be configured to cross-check a list of valid serial numbers received from manufacturer of the DVDs with authentication marker information captured from the DVDs and their boxes to determine whether unauthorized copies of the DVDs have been inserted into the supply-chain.

Figure 6:
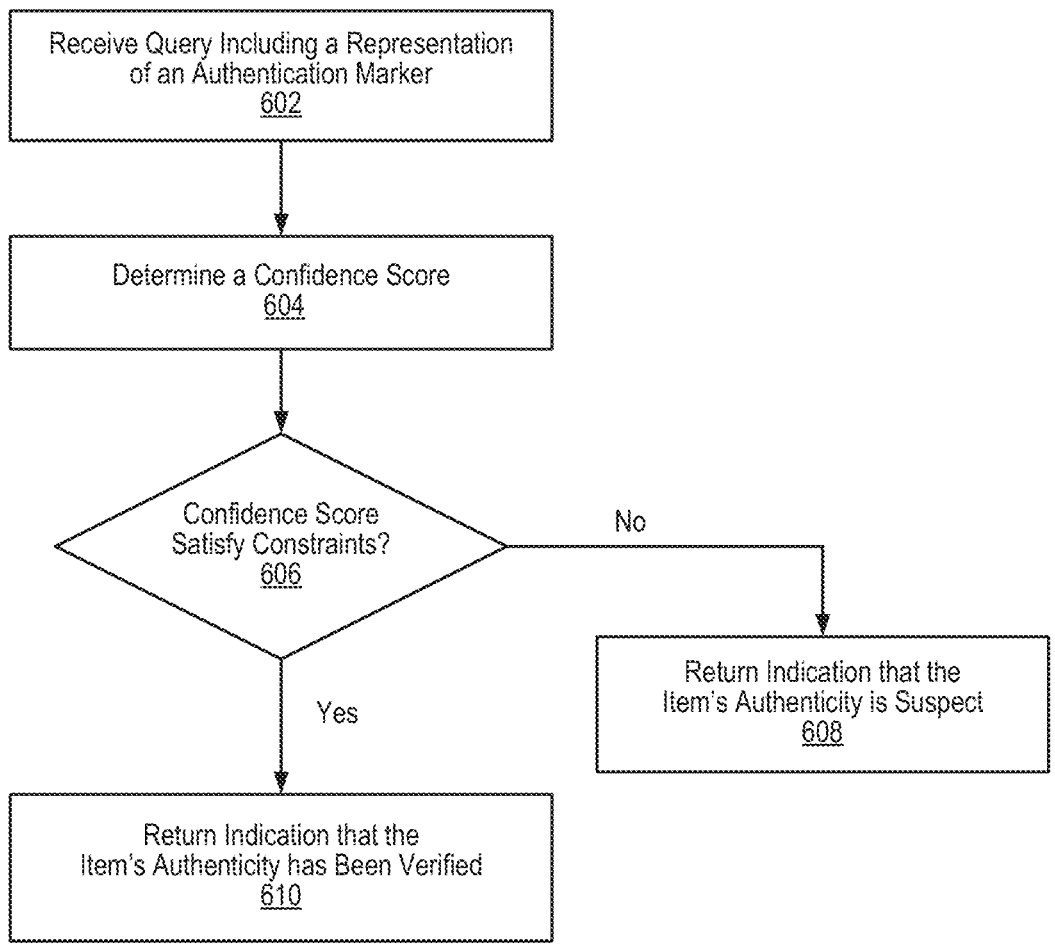
FIG. 6 is a flow diagram illustrating one embodiment of an operational procedure for determining the validity of an authentication marker for an item.

Turning now to FIG. 6, an operational procedure for determining the validity of an authentication marker for an item is illustrated. Operation 602 shows that the unauthorized-product detection system can be configured to receive a query relating to the validity of an authentication marker that includes data representing the authentication marker in question. As described in more detail herein, the data can be expressed numerically, as text (e.g., alphanumeric), as image data, or in other forms, and the data may or may not be encrypted, in different embodiments and the request can include authentication information from the requestor as well as other data generated by an acquisition component (or a control system), such as the IP address of the acquisition component, an identifier of a user operating the acquisition component, etc. For example, the request could be signed by a bailee using a bailee private key, a retailer using a retailer private key, etc. As illustrated in this example, the operational procedure may include determining a confidence score, as shown by operation 604. In an example embodiment, one factor used to compute a confidence score can be a similarity score computed by comparing the queried representation to representations in the data store to determine whether the received representation of the authentication marker matches or is substantially similar to a valid representation of an authentication marker that has been previously registered in the data store. In an embodiment, the authorization engine can compute the similarity score by identifying features in the received representation, such as ridge endings (i.e., points where a ridges end), bifurcations (i.e., points where ridges split) and short ridges (i.e., ridges that are substantially shorter than the length of the average ridge) and attempting to match the location of the features to features found in representations of valid authentication markers. In one embodiment, the query can include an identifier such as a serial number and the authorization engine can use it to locate the valid representation in the data store to compute the similarity score. Alternatively, the authorization engine can compare the received representation to representations of valid authentication markers in the data store until a match is found, the search times out or the authorization engine cannot find a match. Note that the authentication marker may be unique for an individual item instance (e.g., it may represent an item type identifier plus a unique serial number, or a photographic image of an individual item instance), may be shared, but item-type-specific (e.g., it may be shared by all items of the same item type or by all items having the same date or timestamp code or lot code, or similar), or may be shared for two or more different item types (e.g., there may be one authentication marker per brand, product line, manufacturer, etc.). In some embodiments, the authentication marker itself may include (and/or be encoded together with) a serial number or other data representation of unique fingerprint and an indication of a date or timestamp code or lot code.

In example embodiments, the confidence score can be based on the similarity score and additional information and the score can take the form of a value or a vector of values. For example, the confidence score can be based at least in part on whether the matching representation of the authentication marker has been verified (e.g., during this or any other unauthorized product detection operations or authentication marker validation operations thereof) more than a configurable valid number of times. For example, if the valid authentication markers for this type of item are unique to each item instance, the pre-determined maximum number of times that the matching data is expected to be verified may be one, or may be another small number (e.g., if multiple validation operations may be performed for an individual item during the course of normal operations in the materials handling facility). However, if the (supposedly unique) matching data has been verified more than once (or more than a few times), this may indicate that unauthorized reproductions of the item (including its authentication marker) have been produced and inserted into the supply-chain or at a minimum that the current presentation of the authentication marker is less trustworthy. In embodiments in which the matching data represents an authentication marker that is shared between items, the determined maximum number of times that the matching data is expected to be verified may be a large number, which may be dependent on the number of items that share the marker. For example, in one embodiment it may be on the order of 10% more than the number of items produced by the manufacturer or supplied to a given recipient or distributor.

Similarly, information such as the frequency that authentication markers are queried and/or location information associated with each query can also be used to compute a confidence score. For example, in embodiments where authentication markers are unique or reused a small number of times, a large number of queries for the same authentication marker within a short period of time could indicate that the authentication marker is being reused. As such, a value representing the frequency that an authentication marker is queried can be used to influence the confidence score calculation, where the confidence score can lower in proportion to the frequency that it is queried. In these embodiments, the number of times that an authentication marker is expected to be seen and the frequency that markers are received can be configurable values that can be set on a per-item basis using historical information that reflects how often items of this type are queried. In addition, a value in the confidence score calculation can take into account whether subsequent queries for an authentication marker are from different locations. For example, in an embodiment where authentication markers are unique or reused a small number of times, queries occurring near in time for the same representation, but associated with different locations can indicate that the authentication marker is being reused. For example, in an embodiment a query can include information that can be used to determine an associated location, such as an IP address or global positioning system coordinates.

The confidence score may also be based on information such as whether the representation of the authentication marker was received from a valid handler of the item. For example, a "valid handler" in this context may refer to a trusted item provider, a trusted partner, a trusted bailee, a known retailer, an authorized distributor, or any entity in the expected and/or trusted supply-chain, or may refer to any entity that is not explicitly known to be untrustworthy (e.g., based on historical data and/or previously observed behavior). In this example, each trusted entity can be assigned a value based on perceived trustworthiness. In embodiments, this value can be based on factors such as a track record of the entity in regard to handling authorized items and/or measures undertaken by the recipient to prevent the distribution of unauthorized items. In an embodiment where the unauthorized-product detection system uses this information, items received from less trustworthy handlers may in turn be given lower confidence scores.

The confidence score may also be based on whether the item or the item packaging has valid authentication markers on it from item handlers, such as bailees or distributors. In an embodiment, each authentication marker applied to the item or its packaging can be registered and associated with the item. When a party, such as a retailer, takes possession of the item all of the authentication markers on it can be queried. The authentication engine can determine if the authentication markers are valid and match the markers that were registered as applied to the item or its packaging. In the instance that the authentication markers are invalid or do not match the expected markers the authentication engine the confidence score can be reduced accordingly.

Continuing with the description of operation 604, the confidence score can also be based at least in part on whether the data indicates a valid date (or timestamp) code for the item. In some embodiments, this determination may be based on the expected path of the item as it moves through the supply-chain and may include a comparison between the expected history and the dates at which the item actually reached various entities as it moved through the supply-chain. In other embodiments, the determination may be based on the date on which the item was presumed to have been manufactured (e.g., according to the serial number, lot number, and/or other identifiers represented in the matching data). If the data does not indicate a valid date (or timestamp) code for the item the confidence score can be reduced accordingly.

The confidence score may also be based on whether the query includes an indication that the item has been tampered with. For example, in embodiments where image data is provided to the unauthorized-product detection system, the system can also be configured to search for patterns associated with item tampering. In this example, the image data can be processed to find indicators of tampering in the image by searching for broken seals, altered or torn tamper evident packing tape or tears in packaging. Evidence of tampering can in turn be used to influence the confidence score for a given item.

Once a confidence score is determined, and referring to operation 606, the unauthorized-product detection system can determine whether the score satisfies one or more constraints. Some constraints can be hard requirements, where failure of a hard requirement constraint causes the unauthorized-product detection system to fail a query, whereas other constraints can be soft constraints where failure of a soft constraint may be used as one factor for determining whether to return an indicator that the item is suspect or authentic. For example, one example hard constraint can relate to whether the received data is an exact match to a representation of an authentication marker stored in the data store. Here, a matching constraint can be set so that the authentication marker must match an authentication marker in a data store, otherwise the confidence score will return an indicator that the authenticity of the item is suspect. This configuration may be useful when the authentication marker is a number or an alphanumeric string. In another, less restrictive embodiment, the matching constraint can be set so received data that is substantially similar to representation of an authentication marker can satisfy the matching constraint. This configuration may be useful in an embodiment where patterns formed by inherent physical characteristics are used as authentication markers, because the received data may not be an exact match to a representation of an authentication marker in the data store. Another constraint may relate to whether received data matches a representation of an authentication marker that is a gray market good. Here, a gray market good constraint can be set to a value to cause the unauthorized-product detection system to return indications that the item is an authentic but gray market item. Alternatively, if the gray market good related constraint is set to a different value it configures the unauthorized-product detection system to provide indicators relating to the authenticity of the item.

In at least one embodiment, the unauthorized-product detection system can be customized by an item provider, an item handler, or even a consumer. As such, the algorithm used to generate a confidence score as well as the constraints used by the system can be specified by the item provider or an entity such as a retailer. For example, an item provider may configure the system to use only a comparison between stored representations of authentication markers and representations of authentication markers received in queries. On the other hand, an item handler, such as a retailer, may have concerns about a particular item provider or a particular class of items and may configure the unauthorized-product detection system so that some or all of the information described above is taken into account when a query is submitted.

Referring to operations 608 and 610, once the score is compared to a set of one or more constraints an indicator can be determined. As shown by the negative exit from 606, in the instance that the score fails the comparison, the unauthorized-product detection system may provide an indication that the authenticity of the item is suspect. In the opposite case, as shown by the positive exit from 606 unauthorized-product detection system may provide an indication that the authenticity of the item is verified if the score satisfies the constraints.

As previously described, in some embodiments, an unauthorized product detection operation may be invoked only for items that are considered to be at high risk for counterfeiting. In such embodiments, various criteria may be evaluated to determine a counterfeit risk score for at least some of the items received and/or handled in a materials facility and/or to calculate a risk score for an item, and a determination of whether to perform an unauthorized product detection operation for an item may be dependent on that risk score. For example, in some embodiments, the likelihood that unauthorized (e.g., counterfeit) copies of a particular item will be (or have been) produced and inserted into the supply-chain may be dependent on the relative ease of copying the item, the relative ease of copying the authentication markers used to authenticate the item, the trust level of the suppliers from which instances of the item are received (e.g., whether a supplier has been pre-certified by the manufacturer), or a trust level of the supply-chain through which instances of the item are received (e.g., the risk may be lower when each member of the supply-chain is a trusted partner). In some embodiments, the unauthorized-product detection system may be configured so that it can perform detection operations for any and all items when they are received (or at another time), but this operation may be invoked only when a risk score indicates (according to applicable policies in the facility) that the effort is warranted for a given item.

Figure 7:
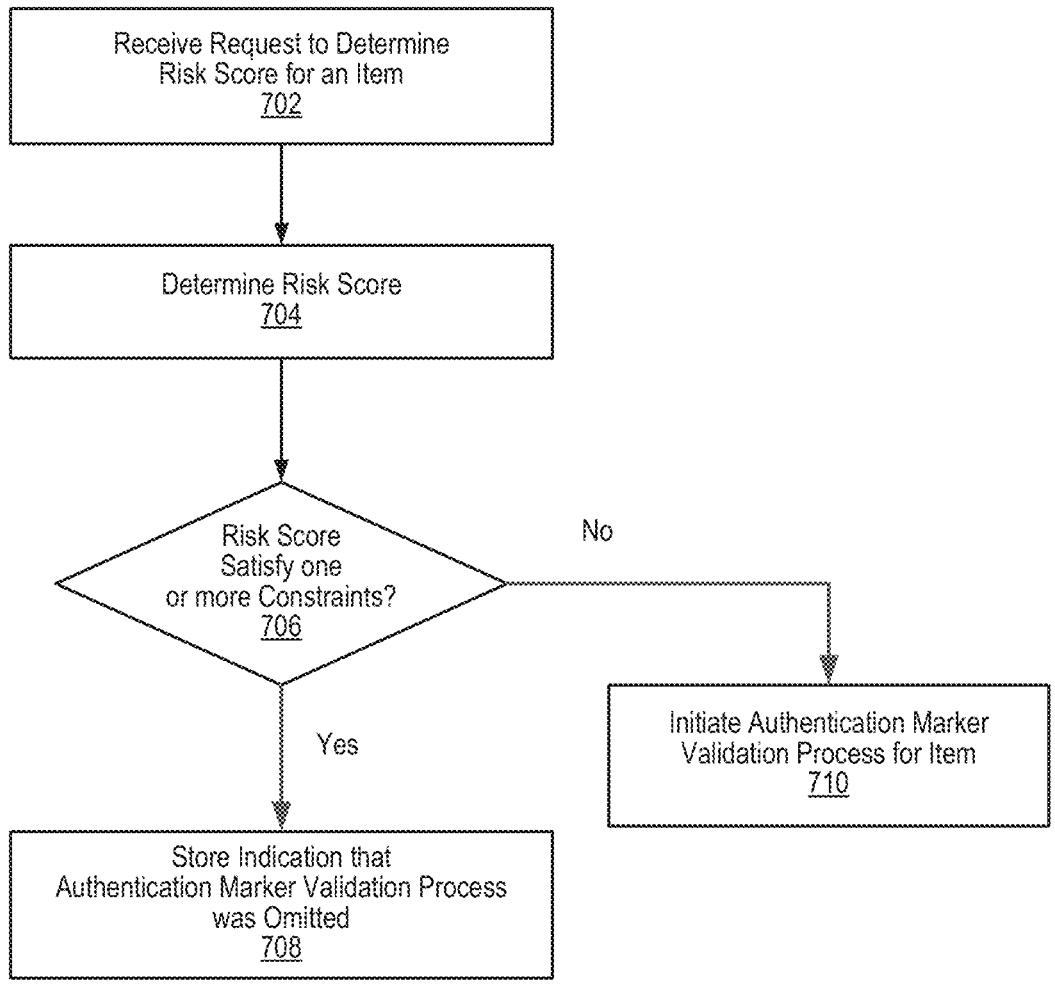
FIG. 7 is a flow diagram illustrating one embodiment of an operational procedure for determining whether to perform an unauthorized product detection operation for an item.

One embodiment of an operational procedure for determining whether to perform an unauthorized product detection operation is illustrated by the flow diagram in FIG. 7. As illustrated by operation 702, the unauthorized-product detection system can receive a request to initiate a risk score calculation for a given item, a class of items, items received from a specific item provider or supplier, etc. For example the unauthorized-product detection system can receive a request from an item provider, item handler, etc., to calculate the risk score, such as when a new item is introduced into the market, or to recalculate a risk score, such as if spot checks reveal unauthorized instances of items in the supply-chain or complaints about a given item are received from customers. In some embodiments, the operational procedure could also be initiated periodically for all items, a random subset of items, items associated with high or low risk scores, etc.

Operation 704 shows that the risk score can be determined. In an embodiment, the risk score can be a value or a vector and can take into account information such as whether the item is associated with a trusted supplier. For example, if an item is associated with a trusted supplier, the resulting risk score may be lower. In other words, the trustworthiness of the supplier of the item may be one factor influencing the generation of a risk score for the item, in some embodiments. If, on the other hand, the item is not associated with a trusted supplier the risk score may be raised. For example, if the item is associated with a trusted manufacturer or received directly from a manufacturer, it may be awarded a lower risk score, but if it was received from an unfamiliar distributor or a third party merchandiser, the risk that counterfeit items have been inserted into the supply-chain may be higher and this could translate into a higher risk score. In another example, items with a high return rate (e.g., items returned individually or in small quantities directly from consumers or from a retailer from whom the consumer presumably bought them) may be considered to be more likely to be counterfeit than items that are not resold or returned.

Continuing with the description of operation 704, another factor that can cause the risk score to be raised or lowered relates to the history of the class that the item belongs to. For example, if there has been a history of counterfeiting items of this type, the operational procedure may include the unauthorized-product detection system raising the risk score for the item. In other words, previous counterfeiting activity for items of this type may be another factor influencing the risk score for the item, in some embodiments. If there is no known history of counterfeiting for items of this type (or if such counterfeiting is relatively rare) the risk score for the item may be lower.

Another factor that may influence the risk score for an item may be the relative ease with which the item and/or its authentication marker(s) can be copied. For example, if items of this type are relatively easy to copy or forge, based on the kind of item it is and what is required to manufacture the item the unauthorized-product detection system (or service) may raise the risk score for the item. Similarly, if the authentication markers used for the items are relatively easy to copy or forge, based on information such as the kind and quantity of authentication markers used on the item or its packaging, the unauthorized-product detection system may raise the risk score for the item.

As illustrated by operation 706, in this example, after taking into consideration any or all of the factors described above (and/or other factors that may influence or reflect the risk that the item is counterfeit), the operational procedure may include determining (e.g., calculating) whether the score satisfies one or more constraints. If the risk score fails one or more constraints, the operational procedure may include initiating an authentication marker validation process for the item, as shown by operation 710. If, on the other hand, the risk score satisfies any required constraints then the authentication marker validation process may be omitted for at least a portion of the items of this type associated with the same item provider, as shown by operation 708. Note that in various embodiments, this determination may only be applicable to an individual item instance, may be applicable to all items of this type for at least the immediate future, or may influence the rate at which items of this type are singled out for unauthorized product detection spot checking. Note also that the results of this determination may be recorded for subsequent analysis and/or tracking. For example, they may be stored in an unauthorized-product detection system data store, and/or may be recorded when updating an item history, in some embodiments.

Note that in some embodiments, a similar decision may be made at the manufacturer about whether to enable unauthorized product detection instead of, or in addition to, by the receiving entity, as described above. For example, a similar analysis may be made to determine whether to invest in generating and/or applying (e.g., with printing, stickers, etc.) unique fingerprints, creating and maintaining data stores and data store entries, supporting encryption, and/or purchasing software and hardware to support unauthorized product detection operations for particular items or product lines. Such an analysis may be used to determine cost/risk tradeoffs for different types of products before investing in the infrastructure required to maintain and provide unauthorized product detection operations as a service and/or to a service. Note that although a determination by a manufacturer about whether to support unauthorized product detection operations for certain items may be based on some of the same factors that are described above, in some embodiments, more, fewer, or different factors may be considered than those described above (e.g., the newness and/or popularity of an item, the price of the item, the number of alternate sources for an item, the volume of items produced by the manufacturer and/or any alternate suppliers, or the potential impact of passing counterfeit items of a certain type to consumers).

As previously noted, in some embodiments, an authentication marker for an item may represent an inherent physical characteristic of the item or its packaging, and may be dependent on the composition of a material used in manufacturing and/or packaging the item. In some cases, the authentication marker may represent a physical characteristic that is shared between multiple items of the same type or multiple items of different types that were manufactured and/or packaged using the same materials and/or processes. In other embodiments, the authentication marker may represent a physical characteristic that is unique to an individual item instance (e.g., a fiber pattern or a manufactured pattern in a designated portion of the item or its packaging). In embodiments in which an authentication marker is not unique to an individual item instance, the use of a combination of such markers may make the item much more difficult to counterfeit and insert into the supply-chain without detection.

Figure 8:
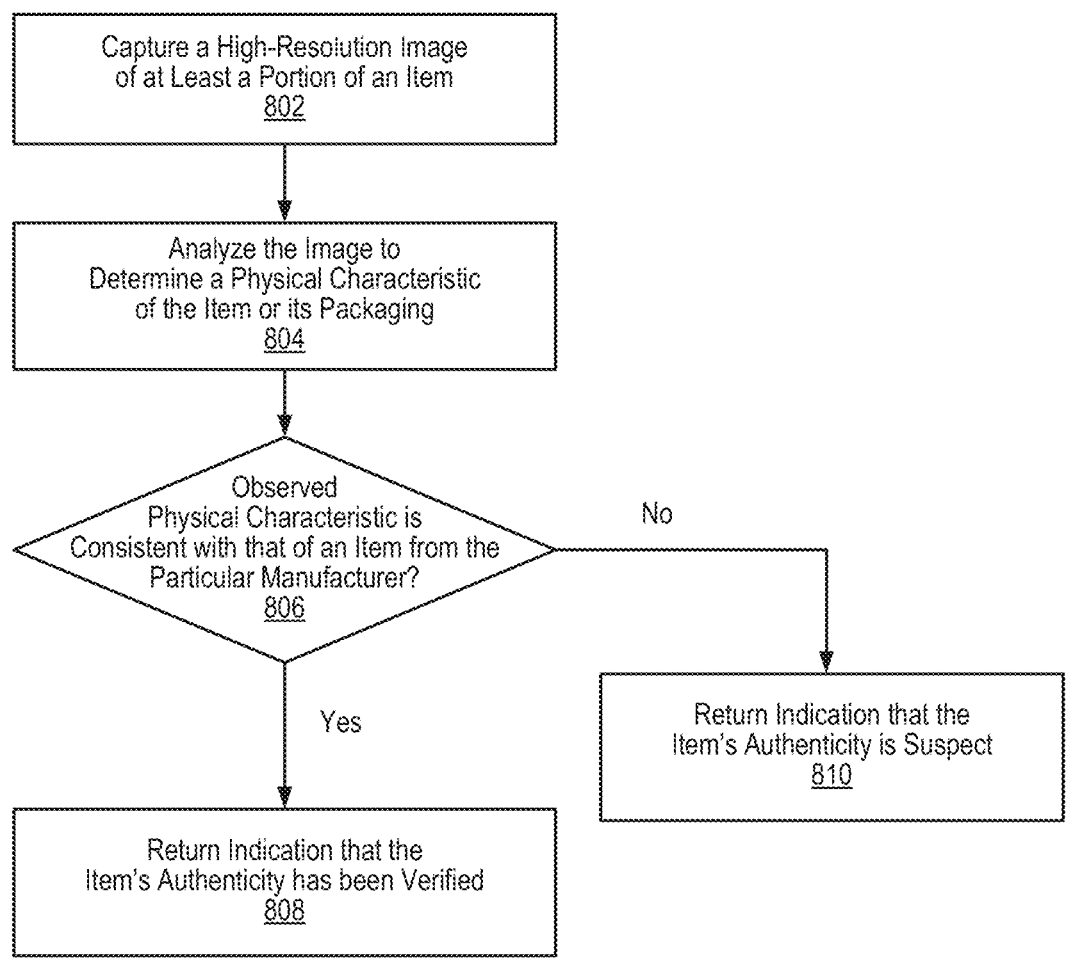
FIG. 8 is a flow diagram illustrating one embodiment of an operational procedure for performing unauthorized product detection using an image of a physical characteristic of an item or its packaging.

One embodiment of an operational procedure for performing unauthorized product detection using an image of a physical characteristic of an item or its packaging is illustrated by the flow diagram in FIG. 8. As illustrated in this example, the operational procedure may include an operation 802, which shows capturing a high-resolution image of at least a portion of an item received in a materials handling facility that is alleged to have been produced by a particular manufacturer. For example, in some embodiments, a high-resolution image may be captured of a particular portion of an item (or the item packaging) that is expected to contain an authentication marker. In other embodiments, an image of an authentication marker may be detected in (and extracted from) a high-resolution image of an item through post-processing.

After the image data is acquired, it can be sent to an unauthorized-product detection system. The image data can be received and an authorization engine can be configured to analyze the image to determine a physical characteristic of the item or its packaging that is visible (or that is discernible by an image processing and analysis component) in the image, as shown by operation 804. For example, in some embodiments, the captured image and/or one or more stored images of items known to have been produced by the particular manufacturer may be analyzed (using various image post-processing techniques) to detect a matching fiber pattern or another matching characteristic of the composition of one of the materials used to produce or package the item (e.g., a metal, plastic, composite material, or paper product) or a manufactured pattern formed by protrusions or the like in the item. If the observed physical characteristics are consistent with that of an item from the particular manufacturer (shown as the positive exit from operation 806), the operational procedure may include returning an indication that the authenticity of the item has been verified, as in operation 808. However, if the observed physical characteristics are not consistent with that of an item from the particular manufacturer (shown as the negative exit from operation 806), the operational procedure may include returning an indication that the item's authenticity is suspect, as in operation 810. Note that in some embodiments, such returned indications may be communicated to the source of the high-resolution image and/or to the presumed manufacturer individually or along with return indications corresponding to one or more other unauthorized product detection operations (e.g., as aggregated data in daily, weekly, or monthly reports).

As previously noted, the techniques described above may in some embodiments be combined with one or more encryption techniques. For example, an unauthorized-product detection system may employ digital signatures that are generated based on serial numbers or other unique item identifiers such as a value representing a fiber pattern of material of an item or its packaging (e.g., by encrypting them using a private asymmetric key) as authentication markers, and may apply these digital signatures to items and/or their packaging to enable unauthorized product detection. In such embodiments, new digital signatures could not be generated by a counterfeiter without knowing the private key. In other embodiments, digital signatures that can be used as authentication markers may be generated from serial numbers or other unique item identifiers using a hash function that is specific to a manufacturer.

Figure 9:
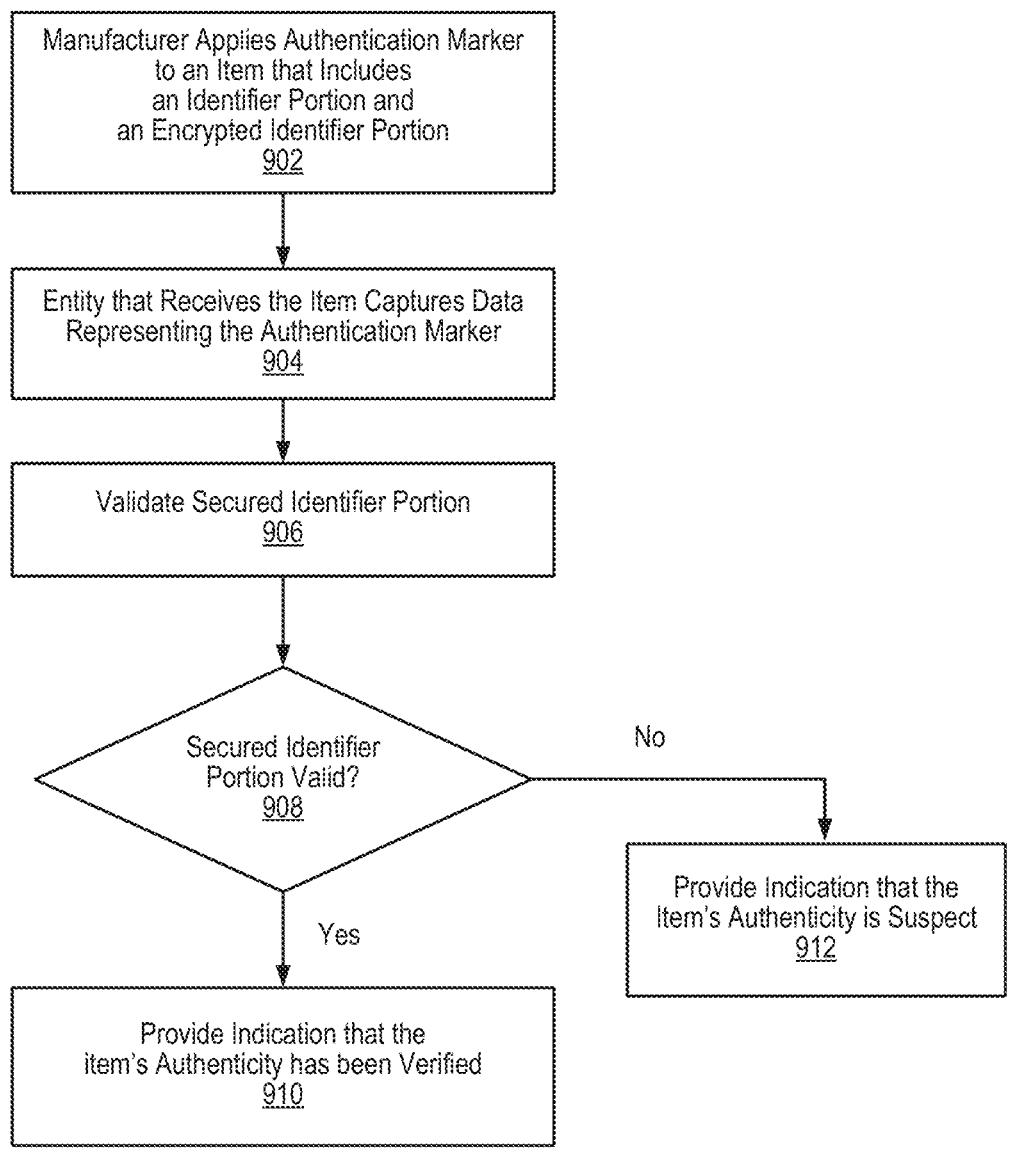
FIG. 9 is a flow diagram illustrating one embodiment of an operational procedure for performing unauthorized product detection using encrypted identifiers.

One embodiment of an operational procedure for performing unauthorized product detecting using one or more encrypted identifiers is illustrated by the flow diagram in FIG. 9. As illustrated at operation 902, in this example, the operational procedure may include a manufacturer applying an authentication marker to an item (or its packaging) that includes an identifier portion (e.g., a serial number) or a value that represents physical characteristics of the item of its packaging and a secured identifier portion. For example, the authentication marker may have been generated by the manufacturer or may have been generated by an external unauthorized-product detection system and provided to the manufacturer (e.g., in embodiments in which only the operator of the system knows the encryption secrets). In some embodiments, the secured identifier portion of the authentication marker may have been generated using a hash of the identifier portion using a private asymmetric key that is manufacturer-specific, location-specific, lot-specific, or specific to a particular product line or item type). As illustrated in FIG. 9, the operational procedure may include the entity that receives the item capturing data representing the authentication marker, as in operation 904. For example, the receiving entity may capture a photograph image of the authentication marker with a high-resolution camera, or the receiving entity may capture data representing the authentication marker in other data formats using a scanning type device.

Continuing with the description of FIG. 9, the receiving entity can validate the secured identifier portion, as shown by operation 906. For example, if the receiving entity has access to the appropriate encryption or decryption key, the operational procedure may include the receiving entity applying the encryption key to the identifier portion of authentication marker or applying the decryption key to the encrypted identifier portion of the authentication marker. For example, the receiving entity may be a trusted partner or member of the manufacturer's supply-chain and may be entrusted with such secrets. If the receiving entity does not have access to the appropriate encryption or decryption key, the receiving entity can send the captured data to the unauthorized-product detection system for validation, and the service applying the encryption key to the identifier portion of authentication marker or applying the decryption key to the encrypted identifier portion of the authentication marker. For example, if the receiving entity is a retailer, a consumer, or an unknown or untrusted entity, the authentication marker validation operation may be performed by the manufacturer or by a trusted third party (e.g., a centralized clearinghouse) that provides unauthorized product detection services, and the encryption secrets may not be shared.

In a more specific example, a manufacturer may generate and apply an authentication marker to an item that includes a serial number portion (or another identifier portion that represents a manufacturer name, brand, item type, lot code, date or timestamp code, unique identifier of item, or image data) and an encrypted serial number portion (i.e., an encrypted identifier portion), and may share the encryption key or a corresponding decryption key with a receiver of the item or with a unauthorized-product detection system. Note that sharing the decryption key may not allow the receiver to generate new digital signatures. In this example, the receiver of the item may capture data indicative of an authentication marker from the item, after which the receiver (or service) may either encrypt the serial number portion of the authentication marker or decrypt the encrypted portion of the authentication marker to see if it matches the other portion of the authentication marker. In a second specific example, an unauthorized product detection service may generate and send encrypted authentication markers to the manufacturer to be applied to various items (where only the service knows the key), and the receiver of those items may capture representations of authentication markers from the received items and send it to the unauthorized-product detection service for validation. Note, however, that many other operations for incorporating encryption techniques together with authentication markers such as those described herein may be employed in unauthorized product detection, in various embodiments.

As illustrated in FIG. 9, operation 908 shows that the procedure can include determining whether the encrypted or decrypted information matches the captured data and/or whether the authentication marker is otherwise validated. For example, after determining that the authentication is valid, one or more other verification techniques may be employed in the unauthorized product detection operation (including, but not limited to, those described here and in reference to FIG. 9). In this example, if the encrypted or decrypted information matches the captured data and/or the authentication marker is otherwise validated (shown as the positive exit from 908), the operational procedure may include providing an indication that the item's authenticity has been verified, as in operation 910. However, if the encrypted or decrypted information does not match the captured data and/or the validation fails for some other reason (shown as the negative exit from 908), the operational procedure may include providing an indication that the item's authenticity is suspect, as in operation 912. In this example, if the unauthorized product detection operation was performed at the receiving entity, the indication of the results of the unauthorized product detection operation may be provided locally and may also be provided to the presumed manufacturer. If the unauthorized product detection operation was performed by a third party unauthorized product detection service, the indication of the results of the unauthorized product detection operation may be provided to the receiving entity and may also be provided to the presumed manufacturer.

Note that in other embodiments, an authentication marker may not include both an unencrypted and an encrypted version of an item identifier, but only an encrypted item identifier (which may be a unique identifier or a shared identifier, as described herein). In some such embodiments, a receiving entity (i.e., an entity that receives an item on which the authentication marker has been applied) may simply take a picture of the encrypted identifier on the item, and then send it to an unauthorized-product detection system for validation. In still other embodiments, a receiving entity may decrypt the encrypted identifier on the item and compare it with a list of valid authentication markers that was previously provided by the manufacturer. In such embodiments, the receiving entity may or may not also evaluate other criteria in determining whether the item is likely to be authentic or counterfeit, including, but not limited to, the number of times the authentication marker has been verified. Note also that by employing an encryption scheme such as those described herein, a materials handling facility or other receiving entity that is trusted with an encryption or decryption key may not need to keep checking with the manufacturer about whether various authentication markers include a valid identifier, thus lowering the amount of required communication between the materials handling facility or another receiving entity and the manufacturer.

As described herein, in various embodiments, unauthorized product detection operations may be performed on behalf of manufacturers, distributors, wholesale customers, retailers, and/or consumers by an unauthorized-product detection system that serves as a central clearinghouse for unauthorized product detection. By providing unauthorized product detection services to manufacturers and their clients centrally, the manufacturers and clients may only need a high-resolution camera with connectivity capabilities to enable unauthorized product detection. In other words, there may not be much infrastructure required to support unauthorized product detection other than at the service provider. Note that in some embodiments, various expensive or sought-after items (e.g., high-end electronics items that include internet connectivity capabilities) may include hardware and/or software that is configured to allow these items to contact an unauthorized product detection service in order to validate their own authenticity and/or track their own history (e.g., to report their arrival at various locations within the supply-chain back to the service for comparison with an expected item history).

Note that in some embodiments, and as described above, the unauthorized-product detection system described herein may be used in conjunction with various web-based fulfillment services (e.g. an online catalog or web-based marketplace). For example, a consumer may be offered "verified authentic" products, or the interface of a web-based fulfillment service may display various menus or menu options indicating which products have been "verified authentic" by the fulfillment service and which have not. In some embodiments, an unauthorized product detection operation may be initiated by a web-based fulfillment service in response to the selection of an option indicating that a client is willing to purchase a particular item if the online fulfillment service first verifies its authenticity using the unauthorized-product detection system.

In some embodiments a web-based fulfillment service may offer the same item as sold by a variety of third-party merchants (as well as, potentially, the web-based fulfillment service itself). In some embodiments a single item detail page is presented to customers that offer to sell any of the items to customers. The page may display the item more prominently from the merchant which is believed to offer the best overall package for the item. For example, the web-based fulfillment service may take into account factors such as the price, shipping prices, reputation of the merchant, availability of the item, etc. in determining which item is displayed more prominently. Thus, in some embodiments, another factor that is taken into consideration for determining the item's prominence on the detail page is whether the item has been verified as authentic by the unauthorized-product detection system.

Figure 10:
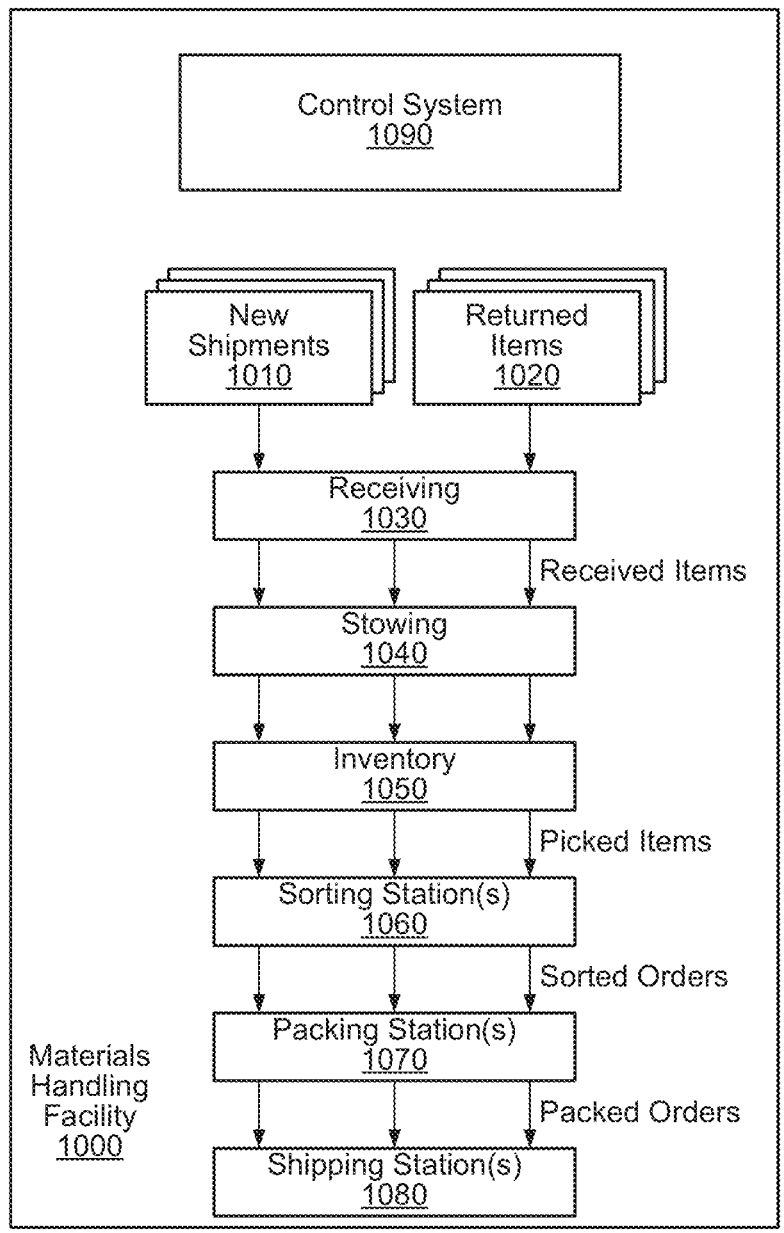
FIG. 10 illustrates a broad view of the layout and operations of a materials handling facility that utilizes an unauthorized-product detection system, according to one embodiment.

In various embodiments, an order fulfillment facility, or another type of materials handling facility, may implement and/or communicate with a unauthorized-product detection system in order to determine whether items received, handled, and/or stored within the facility are (or are likely to be) counterfeit items rather than authentic products produced by the manufacturer from whom they are alleged (or presumed) to have been sourced. FIG. 10 illustrates a broad view of the layout and operations of a materials handling facility 1000 that is configured to utilize an unauthorized-product detection system. In this example, multiple customers may submit orders for items handled in the facility, where each order specifies one or more items from inventory 1050 to be shipped to the customer that submitted the order. As illustrated in this example, the materials handling facility 1000 may include a receiving operation 1030 for receiving shipments of inventory items (i.e., stock) from various vendors and a stowing operation 1040 for placing the received stock into stock storage (inventory 1050). As illustrated in this example, both new shipments 1010 and returned items 1020 may be received at the facility. In some embodiments, a stowing agent, i.e., an agent engaged in a stowing operation, may be provided instructions to stow an item in a particular location and/or position in a given inventory area within inventory 1050. To fulfill customer orders, the items specified in each order may be retrieved or "picked" from inventory 1050 (which may also be referred to as stock storage) in the materials handling facility 1000. Picked items may be delivered to one or more stations in the materials handling facility (e.g., sorting stations 1060, packing stations 1070, and shipping stations 1080) for sorting into their respective orders, packing, and finally shipping to the customers.

In this example, items in inventory 1050 may be marked or tagged with a standard barcode, a 2D or matrix type barcode, an RFID tag, a UPC designator, an SKU code, an ISBN, a serial number, and/or another designation (including proprietary designations) to facilitate operations of materials handling facility 1000, including, but not limited to, picking, sorting, and packing. These designations, or codes, may identify items by type, and/or may identify individual items (e.g., individual product instances) within a type of item. In some embodiments, one or more of these identifiers or other item identifiers (e.g., a digital watermark or an inherent physical characteristic of an item or its packaging) may serve as an authentication marker for a given item, as described herein.

As described herein, unauthorized product detection operations may be utilized in several areas of a materials handling facility. For example, in some embodiments, an unauthorized product detection operation may be invoked to determine the authenticity of various items as they are received in new shipments 1010 or as returned items 1020 at receiving 1030, dependent on data representing authentication markers of those items that is automatically or manually captured using cameras, scanning devices, or other types of input mechanisms. In other embodiments, an unauthorized product detection operation may be invoked to determine the authenticity of various items during stowing 1040 or when picking them from inventory 1050, during a spot check of items stored in inventory 1050, or in response to returns, complaints, or detection of counterfeit items of the same type or from the same source. In still other embodiments, an unauthorized product detection operation may be invoked to determine the authenticity of various items at sorting stations 1060, packing stations 1070, and/or shipping stations 1080 prior to shipping them to customers.

In some embodiments, an unauthorized-product detection system may be configured to capture, receive, and/or analyze image data from multiple cameras in the facility as the normal operations of the facility are performed. In such embodiments, the unauthorized-product detection system may be configured to store images captured by the cameras for subsequent analysis (e.g., one performed randomly, periodically, or in response to various conditions that trigger an unauthorized product detection operation).

Note that an order fulfillment facility such as materials handling facility 1000 illustrated in FIG. 10 may implement a control system 1090 as part of its overall inventory management system. The control system 1090 may include hardware and software configured for assisting and/or directing agents in the materials handling facility 1000. For example, the control system 1090 may provide instructions to a stowing agent to direct the agent to a particular area within inventory 1050, and may present additional information (e.g., text or image information) to assist the agent in locating a specific position within the inventory area in which an item is to be placed as well as instruct the agent to check whether the item is authorized. The control system 1090 may include, or may be used in conjunction with handheld, mobile and/or fixed communication devices (e.g., cameras, scanners, or scanning devices) that may be able to scan or capture images of authentication markers or other tags on individual items (or their packaging) and/or images of inventory areas in which items are stowed in order to determine and record an identifier of an item and/or an item location. This information may be stored in the product data store for subsequent use in locating the specific item (e.g., the specific copy of an item of a particular type) and/or to facilitate unauthorized product detection. Similarly, the control system 1090 may provide instructions to a picking agent, i.e., an agent engaged in a picking operation, to direct the agent to a particular area within inventory 1050, and may present additional information (e.g., text or image information) to assist the agent in locating and obtaining a particular item from the inventory area. The instructions may include location, position, and/or descriptive information for the item (e.g., information stored in a product database on behalf of the materials handling facility), and may be usable by the picking agent to locate and identify the item to be picked. In some embodiments, the control system 1090 may be configured to implement some or all of the unauthorized product detection operations described herein, or to communication with an unauthorized-product detection system that implements those operations.

Note that the arrangement and order of operations illustrated by FIG. 10 is merely one example of many possible embodiments of a materials handling facility that utilizes an unauthorized-product detection system. Other types of materials handling, manufacturing, or order fulfillment facilities may include more, fewer, or different operations and resources, according to different embodiments. Note also that the various operations of a materials handling facility may be located in one building or facility, or alternatively may be spread or subdivided across two or more buildings or facilities. In addition, note that secure communication links (e.g., communication links for exchanging encrypted information) and/or private networks may be employed between an unauthorized-product detection system and various manufacturers on whose behalf the service operates to exchange information, and also between the system and its clients, in some embodiments.

In some embodiments, one or more agents may initiate an unauthorized product detection operation (e.g., through an interface of an application executing on an acquisition component), and in response, the control system 1090 may send a request to the unauthorized-product detection system directly to determine whether an item of interest is likely to be authorized or unauthorized. In various embodiments, this determination may include any or all of the techniques described herein, including, but not limited to, comparing authentication markers with stored images and/or other information (e.g., encrypted or unencrypted item identifiers, date or timestamp codes, etc.)

In some embodiments, the control system 1090 may be configured to communicate results of the unauthorized product detection operation to an acquisition component of the agent who initiated it. For example, in some embodiments, the returned results may be expressed as an electrical signal (e.g., one that lights a red light or a green light on the acquisition device to indicate the results). In other embodiments, the returned results may be expressed in a text format by data transmitted to and/or presented on a display of the acquisition device to indicate the results (e.g., "guaranteed authentic" or "60% likely to be counterfeit").

In some embodiments, the control system 1090 and acquisition components may each be configured to communicate wirelessly (for example via radio communication, or wireless networking), allowing agents to move freely around the facility while initiating unauthorized product detection operations and/or receiving results of those operations. In other embodiments, a wired communication protocol may be used to initiate unauthorized product detection operations or to convey instructions and/or other information from the control system to agents regarding the actions they are to perform within the facility. In various embodiments, acquisition components may include, but are not limited to, one or more of: handheld devices, devices worn by or attached to the agents, and devices integrated into or mounted on any mobile or fixed equipment of the materials handling facility such as push carts, bins, totes, racks, shelves, tables, and work benches, according to various embodiments. For example, acquisition components may include cameras, barcode scanners, RFID scanners, Personal Digital Assistants (PDAs), mobile phones, or other handheld devices, proprietary devices or any other devices suitable to communicate with the control system 1090. In general, an acquisition component may be any device that can communicate with the control system 1090 and convey instructions and other information to agents. In one embodiment, at least some of the acquisition components may be configured to scan or otherwise read or receive codes or identifiers of various components in the materials handling facility other than the items stored in the facility and to communicate those codes or identifiers to the control system 1090 for use in directing agents in performing various tasks in the facility.

Various techniques described herein for performing unauthorized product detection in a materials handling facility may be implemented by local or remote systems, including systems that provide services to users (e.g., subscribers) over the Internet or over other public or private networks, such as virtual private networks. For example, in an embodiment the unauthorized-product detection system 170 of FIG. 3 can be exposed as a web service. In some embodiments, this service may provide access to information about items that are expected to be received at a particular retailer, items that were actually received at the retailer, and/or unauthorized product detection operations that were performed to determine whether items received by the retailer are authentic, but they may not provide access to information about consumer-initiated operations or manufacturer-specific information that does not involve the particular retailer.

In this example, various entities, such as those illustrated in FIGS. 3A and 3B can be customers of the web service and some or all of the customers can be charged a fee for registering authentication markers, submitting queries, receiving reports, etc. Various different fees and charges can be applied for use of the system. For example, an item provider can be charged a periodic fee based on the number of authentication markers stored on behalf of the provider. In the same, or another embodiment, the fee can be based on the number of queries received for an item provider's authentication markers. Similarly, retailers, wholesalers, and/or consumers can also be charged a per-request fee or a fee based on the number of requests submitted within a time period.

The entities in FIGS. 3A and 3B can use any type of client capable of submitting service requests to a web server associated with the unauthorized-product detection system via network 304, on behalf of a user or a requesting application. For example, a given client may include a suitable version of a web browser, or a plug-in module or other type of code module configured to execute as an extension to or within an execution environment provided by a web browser. Alternatively, a client may encompass an application such as a database application, media application, office application, or any other application that may make use of the services provided by the unauthorized-product detection system. In some embodiments, such an application may include sufficient protocol support (e.g., for a suitable version of HTTP) for generating and processing web service requests without necessarily implementing full browser support for all types of web-based data. That is, a client may be an application configured to interact directly with the web server. In various embodiments, a client may be configured to generate requests for web services according to a Representational State Transfer (REST)-style web services architecture, a document or message-based web services architecture, or another suitable web services architecture. In some embodiments, a client may be configured to provide access to web-based service to other applications in a manner that is transparent to those applications. For example, a client may be configured to integrate with an operating system to provide services in accordance with a suitable variant of the service model described herein. However, the operating system may present a different service request interface to applications than those described herein.

In addition, in an embodiment where the unauthorized-product detection system 170 is exposed as a web service, the data store 306 may not include representations of authentication markers from all of the participating item providers. Rather, some item providers may maintain their own proprietary data stores that include representations of authentication markers for their own items. One reason an item provider may maintain their own data store is that they may not want to share valid representations of authentication markers with a third party, even if it is a trusted third party. Thus, in this configuration the unauthorized-product detection system 170 may act as a global clearing house for authentication markers without having access to all representations of valid authentication markers. Some or all of the functionality described with respect to how the authentication engine 302 determines whether a representation of an authentication marker is valid may also execute at the item provider's location using data in its proprietary data store. As such, an item provider may also have control over the algorithm used to determine a confidence score for their items, control over how to respond to queries and control over what kind of information is collected. For example, the item provider may track where items move through the supply-chain and use the location of the item and who handled the item as factors in determining whether to respond to queries with indicators indicating that queried representations of authentication markers are valid or not.

In an embodiment where item provider data stores are used, the unauthorized-product detection system 170 may include authentication credentials to enable it to send verifiable requests to the item provider data store. For example, the unauthorized-product detection system 170 may generate a public/private key pair for each item provider that operates an item provider data store and give the public keys to the item providers. When a query including a representation of an authentication marker is received by unauthorized-product detection system 170, the authentication engine 302 can determine from information in the query (such as an identifier of the item provider in the query), to send a request to the item provider data store. The authentication engine 302 can generate a request that includes, for example, the original query or at least a portion of the data in the original query and sign the request using the private key corresponding to the item provider. The authentication engine 302 can then send the request to the item provider data store. The item provider can operate an item-provider authentication engine that can determine whether the representation in the request is valid, using techniques similar to those described above with respect to the unauthorized-product detection system 170. The item-provider authentication engine can response to the authentication engine 302, which can send the response to the requestor.

In various embodiments, the communication network 304 may encompass any suitable combination of networking hardware and protocols necessary to establish web-based communications between clients and the web server. For example, the communication network 304 may generally encompass the various telecommunications networks and service providers that collectively implement the Internet. The communication network 304 may also include private networks such as local area networks (LANs) or wide area networks (WANs) as well as public or private wireless networks. For example, both a given client and the web server may be respectively provisioned within enterprises having their own internal networks. In such an embodiment, the communication network may include the hardware (e.g., modems, routers, switches, load balancers, proxy servers, etc.) and software (e.g., protocol stacks, accounting software, firewall/security software, etc.) necessary to establish a networking link between the given client and the Internet as well as between the Internet and web server. Note that in some embodiments, clients may communicate with the web server using a private network rather than the public Internet. For example, in some embodiments clients may be provisioned within the same enterprise as the resources that provide various services to those clients. In such a case, clients may communicate with the unauthorized-product detection system entirely through a private communication network (not shown).

An unauthorized-product detection system as described herein, may be utilized in a number of different facilities and situations, including, but not limited to material handling facilities, order fulfillment centers, rental centers, distribution centers, packaging facilities, shipping facilities, libraries, museums, warehouse storage facilities, shopping centers, grocery stores, car parking lots, etc., or in general in any large facility in which a need for unauthorized product detection exists.

The operational procedures described herein may in various embodiments be implemented by any combination of hardware and software. For example, in one embodiment, the operations may be implemented by a computer system that includes a processor executing program instructions stored on a non-transitory computer-readable storage medium coupled to the processor. The program instructions may be configured to implement the functionality described herein (e.g., the functionality of a control system, a data store, various communication devices, and/or any other components of the unauthorized-product detection systems described herein).

Figure 11:
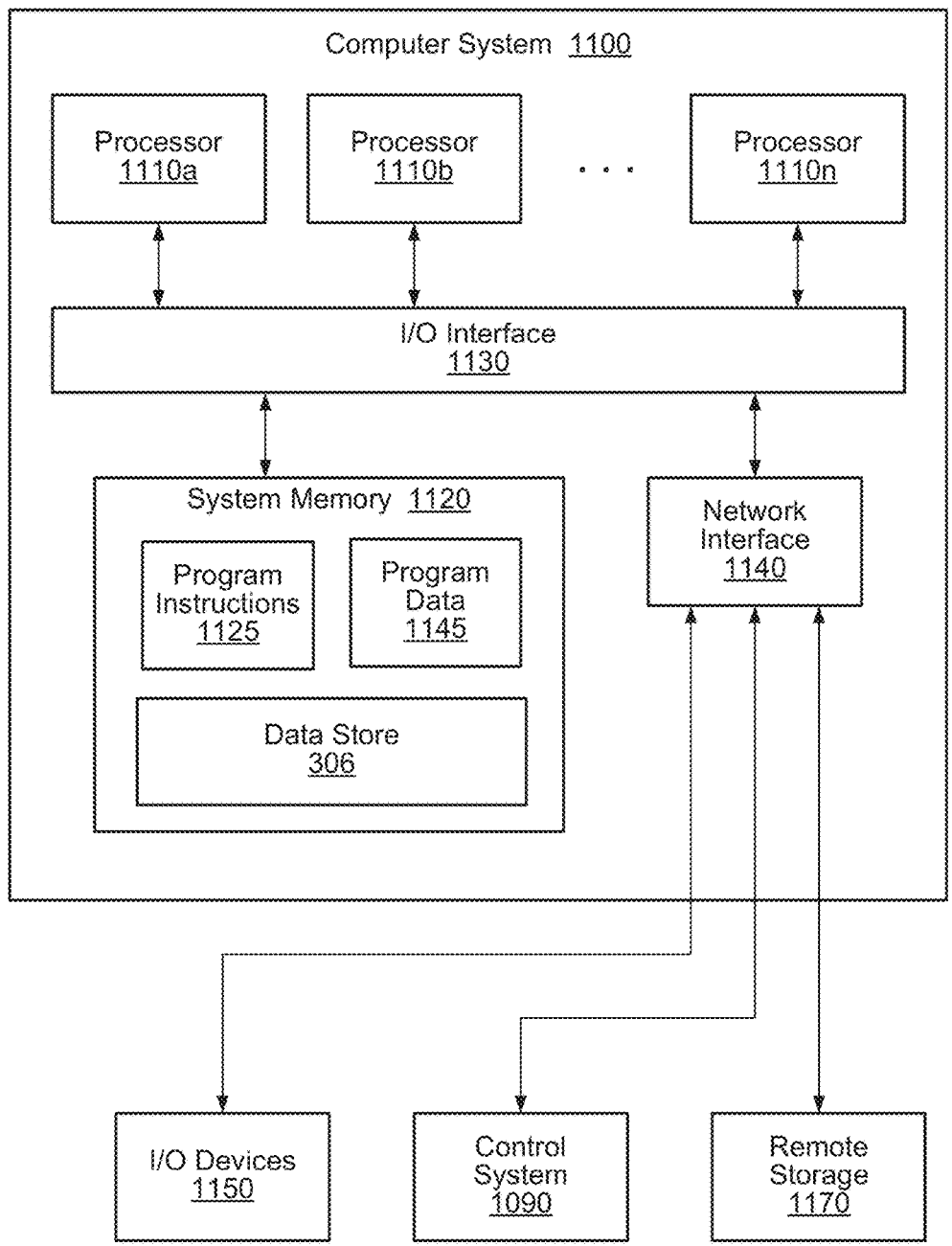
FIG. 11 is a block diagram illustrating one embodiment of a computer system that implements at least a portion of unauthorized-product detection system.

In general, any of various computer systems may be configured to implement the unauthorized-product detection system and operations described herein, in different embodiments. For example, in one embodiment, the unauthorized-product detection system may be implemented using multiple network-enabled cameras or scanners and corresponding servers, while in another embodiment, the unauthorized-product detection system may be implemented using multiple USB-enabled cameras or scanners and one or more personal computer systems. FIG. 11 is a block diagram illustrating one embodiment of a computer system that implements at least a portion of an unauthorized-product detection system in a materials handling facility. For example, in various embodiments, the control system described above, an unauthorized-product detection system (or control portion thereof) or an acquisition component may each include a general-purpose computer system such as computer system 1100 illustrated in FIG. 11. In other words, in various embodiments, computer system 1100 may represent a computer system of a camera, scanner, or other input device that is configured to capture data representing an authentication marker for an item that is located on the item or its packaging, or may represent a computer system that implements a control system or a server that receives or accesses data representing authentication markers and other information.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130. In some embodiments, computer system 1100 may be illustrative of an unauthorized-product detection system, a control system, an acquisition component, or a camera or scanner of an unauthorized-product detection system, while in other embodiments an unauthorized-product detection system, a control system, an acquisition component, or a camera or scanner of an unauthorized-product detection system may include more, fewer, or different elements than those of computer system 1100.

In various embodiments, computer system 1100 may be a uniprocessor system including one processor, or a multiprocessor system including several processors 1110$a$-$n$ (e.g., two, four, eight, or another suitable number). Processors 1110$a$-$n$ may be any suitable processors capable of executing instructions. For example, in various embodiments, processors 1110$a$-$n$ may be general-purpose or embedded processors implementing any of a variety of instruction set architectures (ISAs), such as the x86, PowerPC, SPARC, or MIPS ISAs, or any other suitable ISA. In multiprocessor systems, each of the processors 1110$a$-$n$ may commonly, but not necessarily, implement the same ISA.

System memory 1120 may be configured to store instructions and data accessible by processors 1110$a$-$n$. In various embodiments, system memory 1120 may be implemented using any suitable memory technology, such as static random access memory (SRAM), synchronous dynamic RAM (SDRAM), non-volatile/flash-type memory, or any other type of memory. In the illustrated embodiment, program instructions and data implementing desired functions, such as those operations and techniques described above for implementing a unauthorized-product detection system, a control system, an acquisition component, or a camera or scanner of an unauthorized-product detection system, are shown stored within system memory 1120 as program instructions 1125. For example, the program instructions and data may be configured to implement the authorization engine 302 and data store 306 (which may be centralized or distributed), to receive detected/captured authentication markers, to generate encrypted authentication markers (which may or may not be unique), to compare received authentication marker data to the information stored in the data store, to provide feedback (e.g., an indication of the likelihood that an item is counterfeit) to receiving entities and/or manufacturers, to generate the various reports described herein, and/or to perform image analysis (e.g., image post-processing) to extract authentication markers from images of items.

In some embodiments, system memory 1120 may include at least a portion of the data store 306, which may be configured as described herein. In other embodiments, remote storage 1170 may include at least a portion of the data store 306 instead of, or in addition to, system memory 1120. For example, the information described herein as being stored in a data store may be partitioned between a data store included in system memory 1120 and one or more data stores included on one or more remote storage devices 1170, in various embodiments. In some embodiments, system memory 1120 (e.g., program data 1145 within system memory 1120) and/or remote storage 1170 may store policy information specifying the conditions and/or events that trigger an unauthorized-product detection operation, as described herein.

System memory 1120 (e.g., program data 1145 within system memory 1120) and/or remote storage 1170 may also store image data (e.g., image data that includes representations of authentication markers of various items), or other data representing authentication markers, that was captured by one or more cameras or scanners of an unauthorized-product detection system, and/or image data or other types of data that include representations of authentication markers of authentic items and that was received from the manufacturer of those items or a trusted partner of that manufacturer, in different embodiments. For example, in one embodiment, captured image data or other data representing authentication markers may be resident within system memory 1120 while it is actively being analyzed by program instructions 1125, and may be copied or moved to remote storage 1170 subsequent to active analysis, according to various policies for retention and/or archiving of the data. In some embodiments, upon detection of any condition or event for which unauthorized product detection is warranted, the control system 1090 may be configured to automatically invoke the unauthorized product detection operation. In some embodiments, image data stored in remote storage 1170 (or portions thereof) may be associated with various items that are handled in the materials handling facility in a product database (e.g., as an element of the history of the product).

In one embodiment, I/O interface 1130 may be configured to coordinate I/O traffic between processors 110a-n, system memory 1120 and any peripheral devices in the system, including through network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processors 1110a-n). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments, some or all of the functionality of I/O interface 1130, such as an interface to system memory 1120, may be incorporated directly into one or more of the processors 1110a-n.

Network interface 1140 may be configured to allow data to be exchanged between computer system 1100 and other devices attached to a network, such as other computer systems, for example. In particular, network interface 1140 may be configured to allow communication between computer system 1100 and various I/O devices 1150, control system 1090, and/or remote storage 1170. I/O devices 1150 may include one or more cameras or scanners of an unauthorized-product detection system and/or various communication devices, such as those described herein. In some embodiments, each of the cameras, scanners, or other communication devices may include one or more processors, an image capture component and/or a scanning component, and memory storing program instructions executable on the one or more processors to implement the methods described herein. Network interface 1140 may commonly support one or more wireless networking protocols (e.g., Wi-Fi/IEEE 802.11, or another wireless networking standard). However, in various embodiments, network interface 1140 may support communication via any suitable wired or wireless general data networks, such as other types of Ethernet networks, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a non-transitory computer-accessible medium configured to store program instructions and data as described above. However, in other embodiments, program instructions and/or data may be received, sent or stored upon different types of computer-accessible media. Generally speaking, a non-transitory computer-accessible medium may include computer-readable storage media or memory media such as magnetic or optical media (e.g., disk or DVD/CD-ROM coupled to computer system 1100 via I/O interface 1130.) A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

In one embodiment, the relationship between control system 1090 and I/O devices 1150 may be a server/client type of relationship. For example, control system 1090 may be configured as a server computer system 1100 that may convey instructions to and receive acknowledgements from I/O devices 1150 (including, but not limited to, cameras or scanners of an unauthorized-product detection system and/or other communication devices). In such an embodiment, I/O devices 1150 may be relatively simple or "thin" client devices. For example, I/O devices 1150 may be configured as dumb terminals with display, data entry and/or communications capabilities, but otherwise little computational functionality. However, in some embodiments, I/O devices 1150 (including, but not limited to, cameras or scanners of an unauthorized-product detection system and/or other communication devices) may be computer systems configured similarly to computer system 1100, including one or more processors 1110 and various other devices (though in some embodiments, a computer system 1100 implementing an I/O device 1150 may have somewhat different devices, or different classes of devices, compared to a computer system 1100 implementing the control system). It is further contemplated that in some embodiments, the functionality of control system 1090 may be distributed across some or all of I/O devices 1150. That is, in some embodiments, there may be no centralized point of control of the activity of materials handling facility agents; rather, I/O devices 1150 may function in a cooperative, distributed fashion to coordinate the activities of the materials handling facility.

In various embodiments, I/O devices 1150 may include acquisition devices including cameras, scanners, handheld devices, devices worn by or attached to the agents, and devices integrated into or mounted on any mobile or fixed equipment of the materials handling facility such as pushcarts, bins, totes, racks, shelves, tables, ceilings, walls, and work benches, according to various embodiments. I/O devices 1150 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, or any other devices suitable to communicate with control system 1090. In general, an I/O device 1150 may be any device that can communicate with control system 1090 and convey instructions to agents within the facility. In one embodiment, at least some of the I/O devices 1150 may be configured to scan or otherwise read or receive codes or identifiers of items stored in the materials handling facility or various other components in the materials handling facility and to communicate the entered codes to control system 1090 for use in directing agents in the various operations of the facility (e.g., bar code scanners, RFID readers, cameras, or any other sensing devices) and/or for use in unauthorized product detection.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    an image sensor located in a facility; and
    an unauthorized-product detection system comprising one or more hardware processors, configured to:
        receive from a provider of an item, an image of at least a portion of the item or a portion of the item packaging, wherein the image includes a representation of a physical characteristic of the portion of the item or the portion of the item packaging;
        receive, via an interface of a web service, a captured image of at least a portion of a received item or a portion of item packaging for the received item captured by the image sensor located in the facility; and
        compute a confidence score for authenticity of the received item, wherein the confidence score is computed as a numerical value based at least on two factors, the two factors comprising:
            computation of a similarity score, wherein the computation is based on a comparison of the captured image of at least the portion of the received item or the portion of the item packaging for the received item to the representation of the physical characteristic of the portion of the item or the portion of the item packaging received from the provider of the item, and wherein the comparison is based at least on a match of locations of features of the captured image to locations of features found in the representation of the physical characteristic received from the provider of the item; and
            a frequency that the representation of the physical characteristic has been queried at the web service, wherein the numerical value of the confidence score lowers in proportion to the frequency that the representation of the physical characteristic has been queried at the web service;
        in response to determining that the confidence score for the received item satisfies one or more constraints, provide, via the interface of the web service, an indication that authenticity of the received item is verified; and
        in response to determining that the confidence score for the received item does not satisfy the one or more constraints, provide, via the interface of the web service, an indication that the authenticity of the received item is not verified.

2. The system of claim 1, wherein the physical characteristic of the item or the item packaging is a fiber pattern of a material of the item or the item packaging.

3. The system of claim 1, wherein the physical characteristic of the item or the item packaging is a pattern formed by physical characteristics of the item or the item packaging.

4. The system of claim 1, wherein receiving the image includes receiving, via an application program interface of a service, a request including the image and wherein the unauthorized-product detection system is further configured to:
    authenticate a digital signature in the request with a key associated with the provider of the item; and
    store the image, information identifying the provider of the item and information identifying the item in a data store.

5. A method, comprising:
    receiving, at a web service from a provider of an item, at least one authentication marker for an item;
    receiving, via an interface of the web service comprising one or more hardware processors, a query for an item, the query including a queried-authentication marker for the item;
    computing, by the one or more hardware processors, a confidence score for authenticity of the item, wherein the confidence score is computed as a numerical value based at least in part on two factors, the two factors comprising:
        a frequency that the at least one authentication marker for the item has been queried at the web service, wherein the numerical value of the confidence score lowers in proportion to the frequency that the at least one authentication marker for the item has been queried at the web service; and
        computation of a similarity score, wherein the computation is based on a comparison of the queried-authentication marker for the item to the at least one authentication marker received from the provider of the item and stored in one or more data stores, and wherein the comparison is based at least on a match of locations of features of the queried-authentication marker to locations of features found in the at least one authentication marker received from the provider of the item and stored in the one or more data stores, wherein the one or more data stores include authentication markers for items provided by different item producers; and providing, by the interface of the web service, an indicator indicating whether the item is verified as authentic based on the confidence score.

6. The method of claim 5, wherein the indicator indicates that at least the queried-authentication marker or a substantially similar authentication marker was not found in the one or more data stores.

7. The method of claim 5, wherein the indicator indicates that at least the queried-authentication marker or a substantially similar authentication marker was found in the one or more data stores.

8. The method of claim 5, wherein the indicator is indicated as a color, text, a score, a signal level, an image or a sound.

9. The method of claim 5, wherein the queried-authentication marker is obtained from image data of at least a portion of the item or the item packaging.

10. The method of claim 9, wherein the queried-authentication marker is a representation of a fiber pattern of a material of the item or the item packaging, a representation of a pattern formed by inherent physical characteristics of the item or the item packaging or a representation of a watermark on the item or the item packaging.

11. The method of claim 5, wherein determining the confidence score is further based at least in part on a number of times the at least one authentication marker for the item has been queried, a rate that the at least one authentication marker for the item has been queried, a location associated with the query, location information associated with previous queries for the at least one authentication marker for the item, or an identity of a requester submitting the query.

12. The method of claim 5, wherein the interface of the web service is an application program interface or a console.

13. The method of claim 5, wherein the confidence score is further based on whether a matching representation of the queried-authentication marker has been verified more than a particular number of times.

14. The method of claim 13, wherein the confidence score is further based on a trust value assigned to a handler from which the queried-authentication marker for the item is received from.

15. The method of claim 14, wherein the trust value assigned to the handler is based at least on a history of the handler with respect to handling items.

16. The method of claim 15, wherein reducing the trust value assigned to the handler causes a reduction of the confidence score.

17. The method of claim 5, wherein a requestor that submitted the query has a respective account associated with a respective reference used for authenticating to the web service interface.

18. The method of claim 5, further comprising:
receiving, via the interface of the web service, a request to register a producer-authentication marker for the item, the request including the producer-authentication marker and an identifier of the item producer; and
storing the producer-authentication marker, the identifier of the item producer and an identifier for the item in at least one of the one or more data stores.

19. A system, comprising:
an unauthorized-product detection system implemented by one or more hardware processors and memory and configured to:
receive, by the unauthorized-product detection system from a provider of an item, an authentication marker for the item;
receive, via a web service interface of the unauthorized-product detection system data regarding a received item or the item packaging, the data including an authentication marker for the received item;
compute a confidence score for authenticity of the received item, wherein the confidence score is computed as a numerical value based at least in part on two factors, the two factors comprising:
a frequency that the authentication marker for the item has been queried at the web service, wherein the numerical value of the confidence score lowers in proportion to the frequency that the frequency that the authentication marker for the item has been queried at the web service; and
computation of a similarity score, wherein the computation is based on a comparison of the authentication marker for the received item to the authentication marker for the item or a substantially similar authentication marker in one or more data stores, and wherein the comparison is based at least on a match of locations of features of the authentication marker for the received item to locations of features found in the authentication marker for the item or the substantially similar authentication marker in the one or more data stores, and wherein the one or more data stores include authentication markers for items provided by different item providers; and
provide, by the web service interface, an indicator indicating whether the item is verified as authentic based on the confidence score.

20. The system of claim 19, wherein the indication indicates whether the received item is a counterfeit item or a gray market item.

21. The system of claim 19, wherein the unauthorized-product detection system is further configured to:
provide the indicator to a display device.

22. The system of claim 19, wherein at least a portion of the data is generated by an image sensor.

23. The system of claim 22, wherein the image sensor is part of a hand-held digital camera, a mobile phone, a mounted camera or a tablet computer system.

24. The system of claim 19, wherein a control system is configured to generate at least a portion of the data.

25. The system of claim 24, wherein the unauthorized-product detection system is further configured to:
provide, via the web service interface,
an item detail page including information indicating that the authenticity of the received item was verified.

26. The system of claim 25, wherein the unauthorized-product detection system is further configured to:
charge an item provider, the bailee, the retailer or the wholesaler for access to the web service.

27. The system of claim 19, wherein the authentication marker is a representation of a fiber pattern of a material of the received item or the item packaging, a barcode or a representation of the barcode.

28. The system of claim 19, wherein at least a portion of the data is received from an acquisition component installed in a facility associated with a retailer.

29. The system of claim 28, wherein the acquisition component is operated by a bailee, retailer or a wholesaler.

30. The system of claim 28, wherein the unauthorized-product detection system is operated by a service provider operating the unauthorized-product detection system as a web service.

31. The system of claim 28, wherein the indication is based at least in part on a number of times the authentication marker has been queried.

32. The system of claim 28, wherein the unauthorized-product detection system is further configured to:
determine the indication based at least in part on information indicating a rate that the authentication marker has been queried.

33. The system of claim 28, wherein the data is image data and the unauthorized-product detection system is further configured to:
determine the indication based at least in part on information obtained from the image data that indicates that the item or the item packaging has been tampered with.

34. A system, comprising:
one or more processors; and
a memory storing program instructions that when executed on the one or more hardware processors cause the one or more processors to implement an unauthorized-product detection service configured to:
receive, by the unauthorized-product detection service from a provider of an item, at least one authentication marker for an item;
receive, via an interface of the service, an image of the item or the item packaging;
compute a confidence score for authenticity of the item, wherein the confidence score is computed as a numerical value based at least on two factors, the two factors comprising:
computation of a similarity score, wherein the computation is based on comparison of the image of the item to the at least one authentication marker for the item that is stored in one or more data stores, and wherein the comparison is based at least on a match of locations of features of the image of the item to locations of features found in the at least one authentication marker for the item stored in the one or more data stores; and
a frequency that the at least one authentication marker for the item has been queried at the web service, wherein the numerical value of the confidence score lowers in proportion to the frequency that the at least one authentication marker for the item has been queried at the web service; and
return via the interface of the service to the client the indication of whether the authenticity of the item is verified.

35. The system of claim 34, wherein the client is a materials handling facility that received the item and that is one of a plurality of members of a supply-chain that have access to the unauthorized-product detection service.

36. The system of claim 34, wherein the client is a consumer, and wherein the received data is received from the consumer in response to the consumer invoking an unauthorized-product detection check operation prior to purchasing the item.

37. The system of claim 34, wherein the unauthorized-product detection service is further configured to track a history of one or more items provided by the item producer as they move through a supply-chain, wherein for each item, the history comprises one or more date codes or locations associated with an expected path to be taken by the item as it moves through the supply-chain; and
wherein to determine the indication of whether the authenticity of the item is verified, the unauthorized-product detection service is configured to compare data received from the client to the history of at least one of the one or more items produced by the item producer.

* * * * *